United States Patent
Okamori et al.

(10) Patent No.: US 6,560,048 B1
(45) Date of Patent: May 6, 2003

(54) PRISM HAVING TWO INNER SURFACES AND OUTER SHAPE REGARDED AS PLANE PARALLEL PLATE

(75) Inventors: Shinji Okamori, Tokyo (JP); Shinsuke Shikama, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 27 days.

(21) Appl. No.: 09/670,406

(22) Filed: Sep. 28, 2000

(30) Foreign Application Priority Data

Sep. 30, 1999 (JP) .......................... 11-278490

(51) Int. Cl.[7] .......................... G02B 5/04; G02B 27/00; G03B 21/00
(52) U.S. Cl. .......................... 359/833; 359/834; 359/633; 359/614; 353/33; 353/37; 353/81; 353/99
(58) Field of Search .......................... 359/614, 618, 359/633, 634, 833, 834, 857, 861; 353/33, 37, 81, 98, 99

(56) References Cited

U.S. PATENT DOCUMENTS

| 4,969,730 | A | | 11/1990 | van den Brandt |
| 5,420,655 | A | * | 5/1995 | Shimizu |
| 5,467,146 | A | * | 11/1995 | Huang et al. |
| 5,548,443 | A | * | 8/1996 | Huang |
| 5,552,922 | A | | 9/1996 | Magarill |
| 5,604,624 | A | | 2/1997 | Magarill |
| 5,612,753 | A | * | 3/1997 | Poradish |
| 5,640,479 | A | * | 6/1997 | Hegg et al. |
| 5,796,526 | A | * | 8/1998 | Anderson |
| 5,999,306 | A | * | 12/1999 | Atobe et al. |
| 6,023,365 | A | * | 2/2000 | McDonald |
| 6,179,424 | B1 | * | 1/2001 | Sawamura |
| 6,185,047 | B1 | * | 2/2001 | Peterson et al. |
| 6,250,763 | B1 | * | 6/2001 | Fielding et al. |
| 6,336,724 | B1 | * | 1/2002 | Shouji et al. |
| 6,349,006 | B1 | * | 2/2002 | Okamori et al. |

\* cited by examiner

*Primary Examiner*—Ricky D. Shafer
(74) *Attorney, Agent, or Firm*—Birch, Stewart, Kolasch & Birch, LLP

(57) ABSTRACT

A prism (1) has a first inner surface (114A) and a second inner surface (122) in its interior. The first inner surface (114A) performs total reflection of all rays (20) entering from the exterior, and is disposed apart from a variable mirror element (3) disposed in the exterior, such that the reflected rays are irradiated to the variable mirror element (3). The second inner surface (122) is disposed in proximity to the variable mirror element (3), and totally reflects a bundle of OFF rays from the variable mirror element (3), while allowing a bundle of ON rays from the variable mirror element (3) to pass therethrough.

20 Claims, 25 Drawing Sheets

F I G. 4
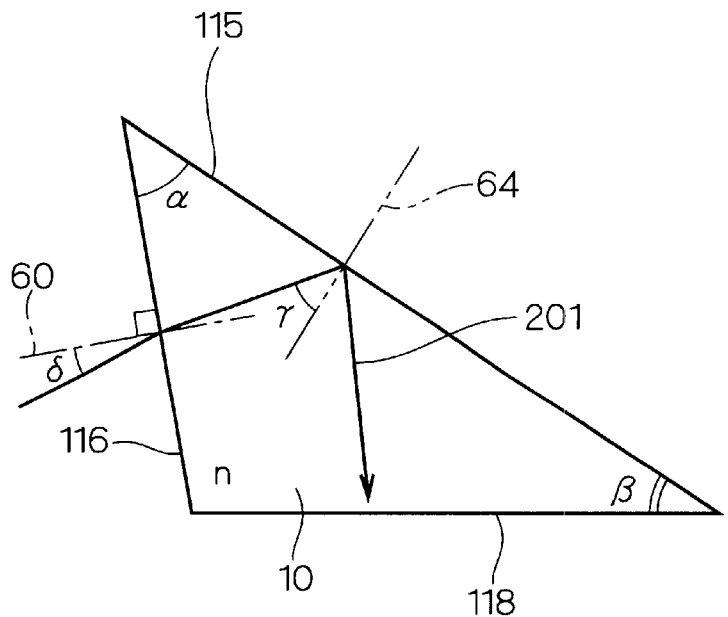
F I G. 5
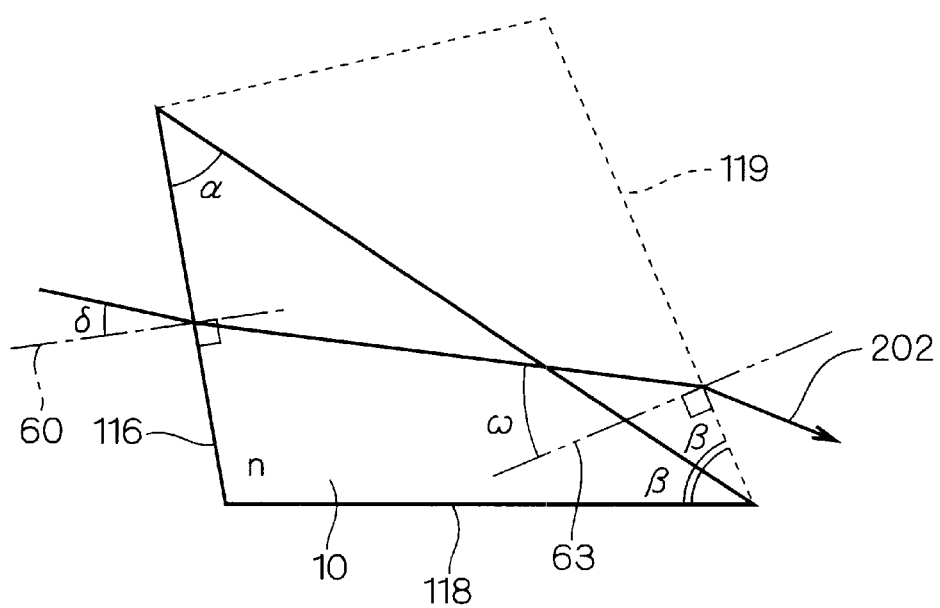

F I G . 1 6
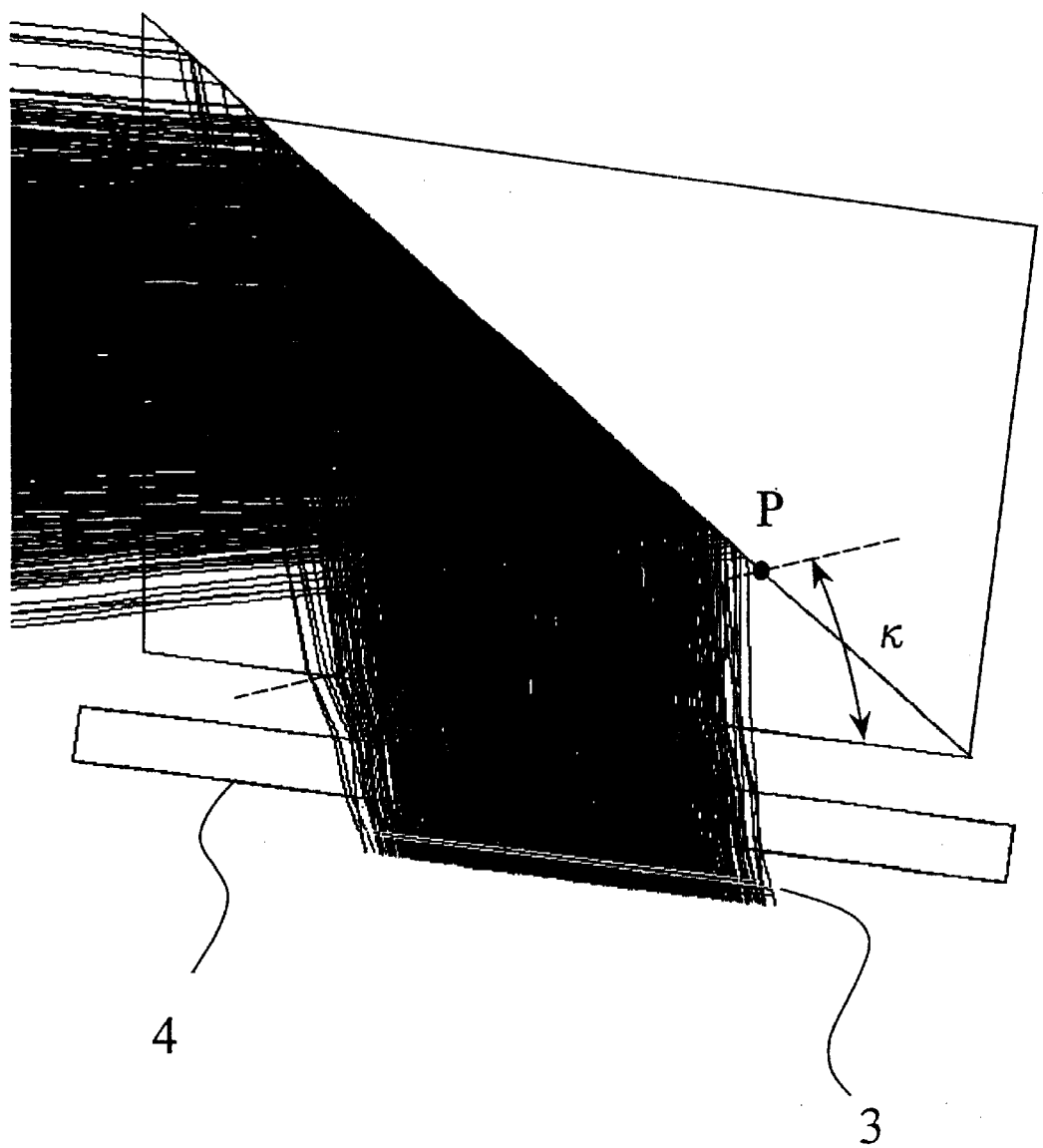

F I G. 3 0 (P R I O R  A R T)
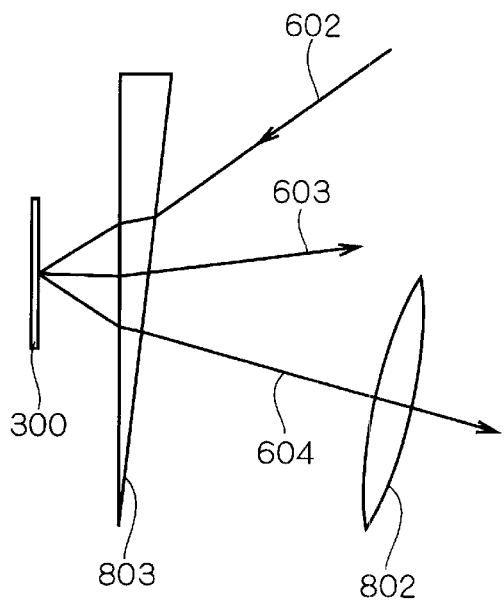
F I G. 3 1 (P R I O R  A R T)
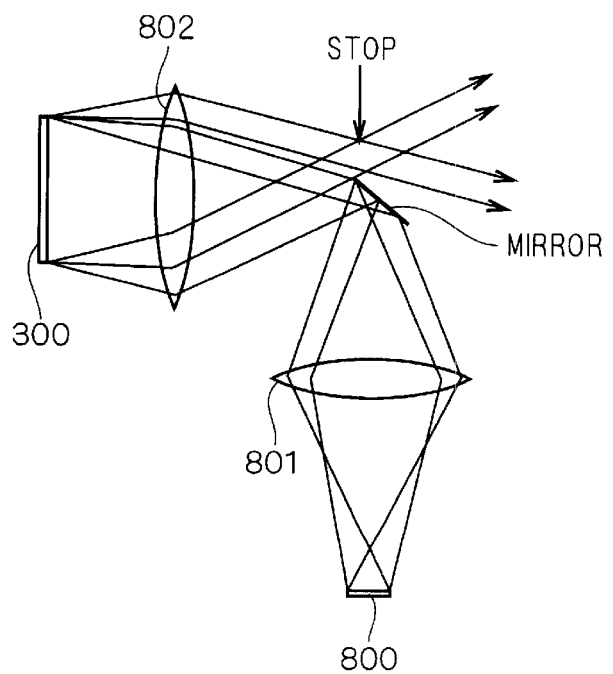

PRISM HAVING TWO INNER SURFACES AND OUTER SHAPE REGARDED AS PLANE PARALLEL PLATE

BACKGROUND OF THE INVENTION

1. Field of the Invention

The present invention relates to a prism, projection optical system using the prism, and projection display device using the projection optical system.

2. Description of the Background Art

Projectors (projection display devices) are now arousing interest as a large screen display. For instance, CRT projectors using a compact CRT of high definition and high intensity, liquid crystal projectors using a liquid crystal panel, and DMD (Digital Micromirror Device) projectors using a DMD, have been commercialized.

Further, the category called "data projector" which not only responds to AV sources such as movies and TV programs, but also projects computer images, is extending rapidly in the market. Its noticeable performance improvements have been made for increasing brightness and contrast of projected image planes, as well as resolution, and uniformity in brightness.

Of these, uniformity in brightness is being one of the most basic requirements as the market of data projectors extends. For instance, in liquid crystal projectors, uniform illuminating technologies such as fly eye integrators have been introduced to attain the compatibility with improvement in brightness.

Meanwhile, light valves such as LCDs and DMDs can be broadly divided into two classes: transmission types and reflection types. The former has a feature that an illuminating optical axis for illuminating a light valve and the optical axis of a projection lens can be coaxially disposed with ease.

It is therefore relatively easy to design an illuminating optical system. This is advantageous in ensuring a basic performance of illuminating the light valve uniformly and brightly.

On the other hand, the latter is inherently disadvantageous because it is often difficult to coaxially dispose an illuminating optical axis and the optical axis of a projection lens, which involves configuration of a complex optical system.

One such illuminating optical system of the reflection type light valve is described in detail in A. G. Dewey, "Projection Systems for Light Valves," Proc. SID, vol. 18/2, pp.134–146, 1977.

FIGS. 28 to 31 are schematic diagrams of illuminating optical systems which are proposed as an illuminating system for reflection type light valve, in the above literature.

Conventional Technique I

FIG. 28 illustrates a typical representative of off-axis illuminating optical systems, which is characterized by illuminating a light valve from a direction that departs from its normal.

In FIG. 28, reference numeral 300 denotes a light valve, numeral 800 denotes a light source, numeral 801 denotes a condenser lens, numeral 802 denotes the final lens of a projection lens on the side on which the light valve 300 is disposed, and numeral 810 denotes an image of the light source 800. Numeral 600 denotes the normal of the light valve 300, and numeral 601 denotes an optical axis of the projection lens.

A bundle of illuminating rays indicated schematically by solid lines in FIG. 28 exits from the light source 800, and is then condensed by the condenser lens 801 and enters the light valve 300. This bundle of rays has the smallest diameter immediately before it enters the final lens 802, thereby forming the image 810 of the light source 800.

Accordingly, the projection lens takes an arrangement of a post-stop lens in which the stop is disposed in an air space on the outside of the final lens 802. The optical axis 601 of the projection lens is parallel to the normal 600 of the light valve 300, however, since these 600 and 601 are not coaxial, the travel direction of the projected light is inclined with respect to the normal 600, as indicated by the dotted arrow.

In addition, it is suited to avoid the physical impingement between the projection lens and the illuminating optical system, because the diameter of the final lens 802 can be reduced depending on the post-stop type.

Conventional Technique II

FIG. 29 is a schematic diagram of an off-axis illuminating optical system different from that in FIG. 28. The references used for FIG. 28 have been retained for similar parts in FIG. 29, and description thereof is thus omitted.

In the point that the stop of a projection lens is disposed within the projection lens system, this optical system has a high possibility that it will be configured by one lens type, the design of which is easier than that of the system in FIG. 28.

Thus, the off-axis optical system as disclosed in Conventional Techniques I or II is excellent in minimizing a focal shift in image planes, because even when projection is made in such an attitude of looking up at the screen, the optical system is less susceptible to keystone distortion (trapezoidal distortion) by which an image plane can be distorted in a trapezoid. That is, it can be said that each optical system is suitable for the front projection type projector which has a high necessity for providing a predetermined elevation angle in the projection direction with respect to the axis of the projector (i.e., which is usually the axis along the vertical direction). In contrast, with either of the optical systems, it is inherently difficult to increase uniformity in illumination because the light valve is illuminated obliquely.

Conventional Technique III

The aforesaid literature further proposes the type in which a prism as shown in FIG. 30 is inserted, and the type in which a reflection mirror is disposed within a bundle of rays as shown in FIG. 31. In FIG. 30, reference numeral 803 denotes a prism, numeral 602 denotes an illuminating light ray, numeral 603 denotes a light ray in the direction of the normal of a light valve 300, which ray is diffracted due to insertion of the prism 803, and numeral 604 illustrates a projected light ray schematically.

It is described that this system can control to some extent the angle formed by the illuminating light ray and projected light ray, thereby increasing the degree of freedom of the optical system's configuration, whereas this system exerts a great influence on the astigmatism and chromatic aberration of the projection lens, resulting in poor practicability.

Conventional Technique IV

FIG. 31 illustrates a self convergent relay optical system in which with a mirror disposed at the position of a stop in a projection lens, an image of a light source to be formed on the stop is reflected by a light valve 300, and the image is formed again in the vicinity of the mirror.

Compared to the three illuminating optical systems in the foregoing Conventional Techniques I to III, this system is superior in the prevention of distortion of projected images and illumination performance. However, the following drawback is pointed out. Specifically, when an illuminating light ray reflected by the mirror enters the lens 802, a reflected light occurs on the surface of the lens 802, and this reflected light becomes a ghost light and reaches the screen.

Like this example, if the lens 802 is disposed in the vicinity of the reflection type light valve 300, a sufficient consideration should be given to the influence which can be caused by light passing through the lens 802 two times during its going and returning.

Any of the four illuminating optical systems thus discussed briefly in the foregoing Conventional Techniques I to IV, has difficulty in attaining both the uniform illumination to the light valve and the prevention of impingement between the illuminating optical system and projections system.

Note that one optical stem which overcomes the above-mentioned drawbacks and is suitable for illuminating variable mirror elements, e.g., DMDs, is disclosed in U.S. Pat. No. 5,604,624.

Conventional Technique V

FIG. 32 is of a longitudinal section of a conventional reflection-type light valve illuminating optical system disclosed in U.S. Pat. No. 5,604,624.

In FIG. 32, reference numeral 140 devotes a prism, numerals 141 and 142 denote the side surfaces of the prism 140, numeral 143 denotes an entrance surface of the prism 140, numerals 144 and 145 are first and second surfaces disposed within the prism 140, respectively, numeral 30 denotes a variable mirror element as a reflection type light valve, numeral 804 denotes a light source, numerals 210 and 211 denote a bundle of rays entering the prism 140, and numerals 210A and 211A denote a bundle of rays passing through the prism 140 and then travelling toward the variable mirror element 30.

The side surfaces 141 and 142 are parallel to each other, and the entrance surface 143 is inclined with respect to the plane direction of the side surfaces 141 and 142. The first and second surfaces 144 and 145 provided with tie prism 140 are substantially held parallel to each other, and a clearance (air gap) is interposed therebetween.

The first surface 144, second surface 145, side surfaces 141 and 142 and entrance surface 143 are contained in their respective planes vertical to the drawing. Although the prism 140 is regarded as a unitary article, which comprises in combination with two prism pieces, functionally it may be considered as being comprised of two parts, namely, a first part bounded by the side surface 142, entrance surface 143 and first surface 144, and a second part which includes the second surface 145 and side surface 141.

It is also described that the prism 140 may be constructed of any optical quality material. As a particular material, one which employs PMMA is disclosed.

Since the first surface 144 is so disposed as to perform total reflection of both of the bundles of rays 210 and 211 entering the first surface 144, the bundles of rays 210 and 211 exiting from the light source 804 and then entering the prism 140 deflect largely as shown in FIG. 32, and then are guided to the variable mirror element 30.

When from the light source 804, light approximately parallel to a main light ray enters the prism 140, this parallel light enters the variable mirror element 30 while the parallelism of the bundle of rays is retained by the total reflection action on the first surface 144.

Thereby, the variable mirror element 30 can be illuminated by the bundles of illuminating rays with the luminance distribution of the light source 804 retained substantially. Therefore, it can be said that the optical system of FIG. 32 is highly advantageous for use as a uniform illumination.

In addition, since the bundles of rays reflected by the variable mirror element 30 do not satisfy the total reflection condition on the first surface 144, the bundles of rays pass through the first surface 144, the air gap, and then the second surface 145 to the projection lens 500. It is therefore easy to avoid the physical impinge between the illuminating optical system and projection lens system.

Thus, this conventional technique is excellent in the uniform illumination of the light valve (variable mirror element 30), and in avoiding the impingement between the illuminating optical system and projection lens system. However, the first surface 144 causes different actions on the bundle of incident rays from the light source 804 and on the reflected light from the variable mirror element 30. Specifically, the first surface 144 performs total reflection of the bundle of incident rays from the light source 804, and allows the reflected light from the variable mirror element 30 to pass therethrough.

A brief description will now be made of a DMD as a typical variable mirror element, which reflects light in the direction of the normal of the variable mirror element, with respect to the oblique incidence of a bundle of illuminating rays.

The DMD is one in which a plurality of micromirrors having a ten and several $\mu$m square are disposed in matrix form on a silicon substrate by employing a semiconductor manufacturing technology, and which is a reflection type light valve that forms a single plane (reflecting surface) by all these micromirrors.

By tilting the respective micromirrors by electric control, the DMD can produce a first reflection state of allowing an incident light to be reflected in the direction of the normal of the DMD, and a second reflection state of allowing an incident light to be reflected in the direction inclined at a predetermined angle to the normal.

Thereby, when viewed from the side thus reflected, an image display is carried out in combination (modulation) of, for example, the first reflection state corresponding to white indication (the reflected light in this case is called "ON light") and the second reflection state corresponding to black indication (this reflected light is called "OFF light").

Accordingly, the light modulated by the DMD is projected through the projection lens 500 to a screen (not shown) to display the video information.

FIG. 33 is a perspective view illustrating an example of two micromirrors constituting a DMD (which correspond to two pixels). In FIG. 33, reference numerals 310 and 311 denote micromirrors, numeral 312 denotes their base, numeral 610 is the normal of the base 312. There are shown the micromirrors 310 and 311, each being inclined at an angle of +10° or −10°, with respect to the normal 610.

Numeral 611 denotes the normal of the micromirror 310 (In FIG. 33, it is inclined at an angle of +10° with respect to the normal 610 of the base 312). Numeral 612 denotes the normal of the micromirror 311 (In FIG. 33, it is inclined at an angle of −10° with respect to the normal 610 of the base 312).

The micromirrors 310 and 311, which have on its surface aluminum deposited thereon, function as a square mirror having high reflectance. In such a case as shown in FIG. 33, the inclination of the micromirrors 310 and 311 is each ±10°, with respect to the normal 610. As a result, the micromirror 310 reflects the light entering from the direction inclined at an angle of 20° to the normal 610, in the direction along the normal 610 (This corresponds to the first reflection state.). On the other hand, the micromirror 311 reflects the light entering from the direction inclined at an angle of 20° to the normal 610, in the direction inclined at an angle of 40° to the normal 610 (This corresponds to the second reflection state.).

Note that more details of the operation and others about the above-mentioned DMD are omitted because it is described in detail in, e.g., "Digital Light Processing for High-Brightness, High-Resolution Applications" by Larry J. Hornbeck, SPIE Vol. 3013, pp.27–40.

In the case of using the above-mentioned DMD, it is required to avoid that any unwanted light caused in the second reflection state is projected on a projected image plane. The reason for this is as follows. Specifically, the contrast of the projected video may be reduced if the OFF light travelling in the direction inclined at an angle of 40° to the normal 610, scatters on the optical path in the projection optical system, a stray light component may occur, alternatively, if this OFF light travels into (enters) the projection lens, ghost light may occur.

In this event, for improving the contrast of the projected image plane, the OFF light has to be guided outside the optical path by some means, or absorbed by a shading member.

For instance, in the optical system characterized by the post-stop lens as described with reference to FIG. 28 (Conventional Technique I), the image-sided aperture of the projection lens can be made small. Therefore, this optical system is substantially advantageous because it can prevent the entry of OFF light.

Referring now to FIG. 34, description will be given of the OFF light behavior in the conventional illuminating optical system as described with reference to FIG. 32 (Conventional Technique V). Note that with regard to a variable mirror element 30, the case of using a DMD will be described (hereinafter referred to as "DMD 30").

In FIG. 34, reference numeral 146 denotes a side surface of a prism 140, numeral 40 denotes a cover glass disposed above the DMD 30, and numeral 613 denotes the normal of the DMD 30. Other numerals are common to those used in FIG. 32, and description thereof is thus omitted.

As indicated by arrows in FIG. 34, the OFF light in the above-mentioned second reflection state exits from the DMD 30, and part of the OFF light reaches a side surface 146 of the prism 140, like light rays indicated by ellipse A of solid line in FIG. 34.

Most of the remaining light rays exit from the prism 140 through the side surface 141, and then travel in such directions as indicated by ellipse B of dotted line in FIG. 34. In this event, the OFF light arrived at the side surface 146 can be handled relatively easily by, for example, applying a photo-absorbent to the side surface 146.

With the arrangement shown in FIG. 34, a considerable ratio of the light rays exiting from the side surface 141 seems to enter a projection lens 500. It is uneasy to make a quantitative examination of the ratio of the bundles of rays indicated by the ellipse B of dotted line, to the entire OFF light, because it depends on the thickness of the prism 140 in the direction of the normal 613, namely, the distance between the side surfaces 141 and 142, and on the size of the DMD 30.

On the contrary, the necessity of preventing the entry of OFF light that causes stray light or ghost light, will be further increased by taking into consideration the fact that the intensity (intensity of light) of the OFF light is approximately the same as that of ON light, and the fact that when the projection lens 500 is a telecentric lens useful for increasing the ratio of quantity of light on the periphery of an image plane, the final lens on the DMD side becomes so large that more components of the OFF light are liable to enter this lens (That is, the possibility of entry is increased).

U.S. Pat. No. 5,604,624 also discloses an optical system that aims to avoid the OFF light entering a projection lens. This optical system is illustrated in FIG. 35.

In FIG. 35, reference numeral 1400 denotes a prism consisting of three prism pieces, numerals 1401 and 1402 denote a pair of surfaces with an air gap disposed therebetween, which have the same action as the paired surfaces 144 and 145 described with reference to FIG. 32, and numeral 1403 denotes a surface through which OFF light exits. Other numerals are common to those used in FIG. 32, and description thereof is thus omitted.

With the prism 1400 of FIG. 35, a first pair of surfaces 144 and 145 provides selective transmission of the reflected light from the DMD 30 and reflection action of the illuminating light to the DMD 30.

A second pair of surfaces 1401 and 1402 provides selective transmission of ON light and OFF light and reflection action of OFF light. Therefore, the prism 1400 can substantially overcome a contrast reduction due to the OFF light entering the projection lens 500, which has been the drawback inherent in the optical system shown in FIG. 32.

With reference to FIG. 35, it will be noted that in order to realize the above-mentioned behaviors of the respective light rays, the prism 1400 obtained by combining prism pieces integrally, has to take an extremely large shape than the prism 140 of FIG. 32.

When the prism 1400 is viewed from the projection lens 500, the prism 1400 can be considered as a plane parallel plate bounded by the side surfaces 141 and 142. In the designing, the distance between the side surfaces 141 and 142 is the parameter directly related to the degree of difficulty of optical design. Increasing this distance increases the back focal distance of the projection lens 500, thus resulting in a noticeable high degree of difficulty of design.

In addition to this, increasing the size of the prism 1400 increases the weight and volume of the projector or increases the amount of optical material, which can cause practical inconveniences, e.g., the additional cost.

In U.S. Pat. No. 5,604,624 there are no particular description about such practical disadvantages. Hence, there has been a desire for a compact prism and a compact illuminating optical system which are suitable for a reflection type light valve, especially for a variable mirror element such as a DMD.

SUMMARY OF THE INVENTION

According to a first aspect of the invention, a prism disposed between an external variable mirror element and an external projection lens having a projection optical axis parallel to a normal of the variable mirror element comprises: a first inner surface comprising a first end spaced a first distance apart from the variable mirror element and a second end, the first inner surface being inclined from the first end to the second end in a direction away from the variable mirror element, the first inner surface being configured to totally reflect a bundle of externally entered rays to propagate the bundle of externally entered rays thus reflected toward the variable mirror element; and a second inner surface comprising first and second ends spaced second and third distances apart from the variable mirror element, respectively, the second inner surface being configured (i) to transmit the bundle of externally entered rays totally reflected from the first inner surface to propagate the bundle of externally entered rays to the variable mirror element, (ii) to transmit a first bundle of rays in a first reflection state among bundles of rays reflected from the variable mirror element, and (iii) to totally reflect a bundle of rays in a second reflection state among the bundles of rays reflected from the variable mirror element, the second reflection state being different from the first reflection state, the first distance being greater than the third distance, the third distance being greater than the second distance, and wherein, when the first bundle of rays in the first reflection state transmitted through the second inner surface enters the first inner surface, the first inner surface transmits the first bundle of rays in the first reflection state to propagate the first bundle of rays in the first reflection state toward the projection lens.

According to a second aspect of the invention, the prism of the first aspect further comprises a third inner surface that is flush with the first inner surface, and comprises first and second ends spaced a fourth distance and the third distance apart from the variable mirror element, respectively, the third inner surface being configured to allow a second bundle of rays in the first reflection state incident thereon without entering the second inner surface, to pass therethrough and propagate toward the projection lens, and to allow a second bundle of rays in the second reflection state incident thereon without entering the second inner surface, to pass therethrough, the second end of the second inner surface corresponding to the second end of the third inner surface.

According to a third aspect of the invention, the prism of the second aspect further comprises: a first outer surface that is disposed at a location opposed to the first inner surface and is an entrance surface which allows the bundle of externally entered rays incident thereon to pass therethrough and propagate through the prism toward the first inner surface; a second outer surface that is disposed at a location opposed to the variable mirror element, the second inner surface and the third inner surface, and comprises a first end corresponding to the first end of the second inner surface and a second end corresponding to the first end of the third inner surface, the second outer surface serving as an optical action surface which allows the bundle of externally entered rays entering after having passed through the second inner surface, to pass therethrough and travel toward the variable mirror element, and which allows the bundles of rays reflected from the variable mirror element, to enter the prism; and a third outer surface that is substantially parallel to the second outer surface, disposed at a location opposed to the projection lens, and comprises a first end disposed above the first end of the third inner surface and a second end adjacent to the second end of the first inner surface, the third outer surface serving as an exit surface that allows transmission of both the first bundle of rays in the first reflection state incident thereon after having passed through the first inner surface, and the second bundle of rays in the first reflection state incident thereon after having passed through the third inner surface, the second, third and first inner surfaces being disposed between the second and third outer surfaces.

According to a fourth aspect of the invention, the prism of the third aspect further comprises: a fourth outer surface that is disposed at a location opposed to the first outer surface, the first inner surface and the third inner surface, the fourth outer surface comprising a first end connected to the first end of the third outer surface and a second end disposed adjacent to and above the second end of the second outer surface; and a shading member that is disposed on the fourth outer surface and absorbs the second bundle of rays in the second reflection state incident thereon after having passed through the third inner surface.

According to a fifth aspect of the invention, the prism of the fourth aspect further comprises a fifth outer surface that is flushed with the second outer surface, and comprises a first end adjacent to the first end of the second outer surface and a second end connected to the first outer surface.

According to a sixth aspect of the invention, the prism of the fifth aspect further comprises: a first prism piece comprising the first outer surface, the fifth outer surface and the first inner surface; a second prism piece comprising the second outer surface, the second inner surface and the third inner surface; and a third prism piece comprising the third outer surface and the fourth outer surface, wherein any one of the first, second and third prism pieces is opposed to the other two via at least one air gap, a surface bounded by the third and fourth outer surfaces among outer surfaces which the third prism piece has is opposed to the first inner surface of the first prism piece and to the third inner surface of the second prism piece, and a surface bounded by the first inner surface and the fifth outer surface among outer surfaces which the first prism has is opposed to the second inner surface of the second prism piece.

According to a seventh aspect of the invention, the prism of the sixth aspect is characterized in that two opposed prism pieces among the first, second and third prism pieces are fixed by a spacer and an adhesive, each having a coefficient of thermal expansion approximately the same as that of the two opposed prism pieces.

According to an eighth aspect of the invention, the prism of the sixth aspect is characterized in that two opposed prism pieces among the first, second and third prism pieces are located opposed to each other, via thin film coatings provided on areas other than a light passage region, on either of opposed surfaces of the two opposed prism pieces.

According to a ninth aspect of the invention, a prism disposed between an external variable mirror element and an external projection lens comprising a projection optical axis parallel to a normal of the variable mirror element, comprises first, second and third prism pieces, the prism being capable of selectively deflecting a bundle of first reflection state rays and a bundle of second reflection state rays that correspond to a first reflection state and a second reflection state, respectively, which are generated by the variable mirror element and are different with each other, (a) the first prism piece comprising: a first surface allowing transmission of a bundle of externally entered rays; a second surface performing total reflection of the bundle of externally entered rays after having passed through the first surface, and allowing transmission of the bundle of first reflection state rays incident thereon after having passed through the first prism piece; and third surface allowing transmission of the bundle of externally entered rays incident thereon after having been totally reflected and propagated through the first prism piece, and allowing the bundle of first reflection state rays incident thereon to propagate through the first prism piece, (b) the second prism piece comprising: a fourth surface being opposed to the third surface and allowing the bundle of externally entered rays incident thereon after having passed through the third surface, to pass therethrough and propagate through the second prism piece, and allowing the bundle of first reflection state rays incident thereon after having propagated through the second prism piece to pass therethrough toward the third surface, the fourth surface performing total reflection of the bundle of second reflection state rays incident thereon after having propagated through the second prism piece; a fifth surface being opposed to the variable mirror element and allowing the bundle of externally entered rays incident thereon after having propagated through the second prism piece, to pass therethrough and propagate toward the variable mirror element, and allowing both the bundle of first reflection state rays and the bundle of second reflection state rays incident thereon, each having been generated when the bundle of externally entered rays is irradiated to the variable mirror element, to pass therethrough and propagate through the second prism piece, the fifth surface being capable of reflecting at least the bundle of second reflection state rays incident thereon after having been totally reflected on the fourth surface and then propagated through the second prism piece; and a sixth surface allowing (i) transmission of both the bundle of first reflection state rays and the bundle of second reflection state rays incident thereon after having passed through the fifth surface and then propagated through the second prism piece without reaching the fourth surface, and (ii) transmission of the bundle of second reflection state rays incident thereon after having been reflected at least on the fifth surface and then propagated through the second prism piece, the sixth surface being capable of performing again total reflection of the bundle of second reflection state rays incident thereon after having been totally reflected on the fourth surface and then propagated through the second prism piece, and (c) the third prism piece comprising: a seventh surface being opposed to the second and sixth surfaces, allowing transmission of the bundle of first reflection state rays incident thereon after having exited from the first prism piece, and allowing transmission of both the bundle of first reflection state rays and the bundle of second reflection state rays which are incident thereon after having exited from the second prism piece; and an eighth surface being opposed to the projection lens, and allowing the bundle of first reflection state rays incident thereon after having passed through the seventh surface and then propagated through the third prism piece, to pass therethrough and propagate toward the projection lens.

According to a tenth aspect of the invention, the prism of the ninth aspect is characterized in that the second surface is parallel to the seventh surface, the third surface is parallel to the fourth surface, the sixth surface is parallel to the seventh surface, and an air gap is provided between parallel surfaces.

According to an eleventh aspect of the invention, the prism of the ninth aspect is characterized in that the second surface is flush with the sixth surface.

According to a twelfth aspect of the invention, the prism of the ninth aspect is characterized in that when α is an angle formed between the first and second surfaces, β is an angle formed between the fifth and sixth surfaces, and κ is an angle formed between the fourth and fifth surfaces, the angle α is larger than 38.0° and smaller than 50.4°, the angle β is larger than 25.0° and smaller than 37.4° and the angle κ is larger than 16.2°.

According to a thirteenth aspect of the invention, the prism of the ninth aspect is characterized in that the third prism piece further comprises: a side surface bounded by the seventh and eighth surfaces; and a shading member that is disposed on the side surface and intercepts the bundle of second reflection state rays incident on the side surface after having passed through the seventh surface and then propagated through the third prism piece.

According to a fourteenth aspect of the invention, a projection optical system comprises: a light source; a condensing optical system condensing rays from the light source; a light intensity uniforming element comprising an entrance surface from which light condensed by the condensing optical system enters, and an exit surface from which a bundle of rays having a substantially uniform light intensity distribution exits; a transfer optical system transferring the bundle of rays exiting from the exit surface of the light intensity uniforming element; the prism of the ninth aspect in which the bundle of rays transferred by the transfer optical system enters as a bundle of externally entered rays; a variable mirror element which is disposed at such a location that in the exterior of the prism, its reflecting surface and the exit surface of the light intensity uniforming element are in a conjugate relationship via the transfer optical system and the prism, and which generates, when reflecting a bundle of rays entering from the prism at the reflecting surface, bundles of first reflection state rays and bundles of second reflection state rays which are different from each other in reflection state; and a projection lens receiving the bundles of first reflection state rays that are emitted from the variable mirror element to the prism and then exit from the prism.

According to a fifteenth aspect of the invention, the projection optical system of the fourteenth aspect further comprises a prism holding member that holds the prism by making contact with a portion of the outer shape of the prism except for portions of the prism through which the bundle of rays from the transfer optical system and the bundles of first reflection state rays pass.

According to a sixteenth aspect of the invention, the projection optical system of the fifteenth aspect is characterized in that the prism holding member comprises a portion for intercepting the bundles of second reflection state rays exiting from the prism.

According to a seventeenth aspect of the invention, the projection optical system of the fifteenth aspect is characterized in that the prism holding member comprises a surface opposed to the projection lens, the opposed surface of the prism holding member comprising a light exit opening sized to allow the bundles of first reflection state rays to pass therethrough.

According to an eighteenth aspect of the invention, a projection type display device comprises: the projection optical system of the fourteenth aspect; a signal generating part configured to generate electric signals for driving the variable mirror element to output the electric signals to the variable mirror element; and a screen configured to receive bundles of rays projected from the projection optical system.

According to a nineteenth aspect of the invention, a projection optical system comprises: a light source; a condensing optical system condensing rays from the light source; a light intensity uniforming element comprising an entrance surface from which light condensed by the condensing optical system enters, and an exit surface from which a bundle of rays having a substantially uniform light intensity distribution exits; a transfer optical system transferring the bundle of rays exiting from the exit surface of the light intensity uniforming element; the prism of the third aspect in which the bundle of rays transferred by the transfer optical system enters as a bundle of externally entered rays; a variable mirror element which is disposed at such a location that in the exterior of the prism, its reflecting surface and the exit surface of the light intensity uniforming element are in a conjugate relationship via the transfer optical system and the prism, and which generates, when reflecting a bundle of rays entering from the prism at the reflecting surface, bundles of first reflection state rays and bundles of second reflection state rays which are different from each other in reflection state; and a projection lens receiving the bundles of first reflection state rays that are emitted from the variable mirror element to the prism and then exit from the prism.

According to a twentieth aspect of the invention, a projection type display device comprises: the projection optical system of the nineteenth aspect; a signal generating part configured to generate electric signals for driving the variable mirror element to output the electric signals to the variable mirror element; and a screen configured to receive bundles of rays projected from the projection optical system.

The prism of first or second aspect of the invention is more compact than the conventional ones (e.g., that shown in FIG. 35).

The prism of the third aspect is capable of reducing the back focal distance of the projection lens disposed outside.

The prism of the sixth aspect is capable of suppressing degradation of resolution based on the relationship between the face-to-face planes of adjacent prism pieces, thereby to realize a reflecting surface using total reflection action.

The prism of the seventh aspect can suppress change in the relative positions of adjacent prism pieces, due to variations in temperature environment, thereby to suppress degradation of performance caused by such change.

The prism of the eighth aspect can securely form an air clearance between prism pieces, thereby to realize the exact air clearance.

The prism of the ninth aspect is more compact than has hitherto been possible.

The prism of the tenth aspect can suppress degradation of resolution based on the relationship between the face-to-face planes of adjacent prism pieces, thereby to realize a reflecting surface using total reflection action.

The prism of the eleventh aspect can facilitate combination of prism pieces.

The prism of the twelfth aspect ensures a total reflection on a predetermined plane, in the range of refractive index of practical prism materials.

The prism of the thirteenth aspect can reliably intercept the reflected light in the second reflection state of the variable mirror element.

The fourteenth aspect can realize a projection optical system providing high brightness and high contrast.

The sixteenth aspect can realize a projection optical system with high contrast which can hold the prism and has a shading function.

The projection optical system of the seventeenth aspect can suppress degradation of performance due to contamination of the prism.

The eighteenth aspect can realize a projection type display device providing high brightness and high contrast.

It is a major object of the present invention to provide a compact prism, a compact projection optical system, and a compact projection type display device.

These and other objects, features, aspects and advantages of the present invention will become more apparent from the following detailed description of the present invention when taken in conjunction with the accompanying drawings.

BRIEF DESCRIPTION OF THE DRAWINGS

FIG. 4 is a schematic diagram illustrating a total reflection condition of light rays incident on a prism;

FIG. 5 is a schematic diagram illustrating the behavior of light rays passing through a prism;

FIG. 16 is a diagram of output of a computer simulation in order to analyze a bundle of illuminating rays deflected by a prism consisting of two prism pieces;

FIGS. 28 to 31 are schematic diagrams illustrating an illuminating system of a conventional reflection type light valve;

DESCRIPTION OF THE PREFERRED EMBODIMENTS

The present invention will be described in detail by referring to the accompanying drawings that illustrate preferred embodiments of the invention.

Projection Type Display Device

A projection type display device comprises (i) a variable mirror element (e.g., element 3 in FIG. 1) which can produce the above-mentioned first and second reflection states; (ii) a signal generating part (e.g., part 2 in FIG. 1) which generates electric signals for driving the variable mirror element so as to correspond to the electric signals related to information about a video signal inputted from the exterior; (iii) a projection optical system including a prism (e.g., part 1 in FIG. 1) having a characteristic configuration as will hereinafter be fully described; and (iv) a screen (e.g., part 90 in FIG. 27), on the surface of which an image is projected on receipt of a bundle of rays projected from the projection optical system.

In the following description, the term "F-number" means a value obtained by expression: $F=f0/D0$, wherein, on the assumption that if a bundle of rays enters an entrance surface, this bundle of rays is regarded equivalently as being a bundle of rays exiting from a single lens (equivalent lens), $f0$ is the focal length of the equivalent lens, and $D0$ is the diameter of an opening of this lens.

In the following preferred embodiments, there are used the following expressions: "F-number of a bundle of illuminating rays", "F-number of a telecentric lens", "F-number of a projection lens", and "F-number of a bundle of reflected rays". Unless otherwise noted, basic definition thereof is to be based on the description made hereat.

First Preferred Embodiment

Prism Configuration

Figure 1:
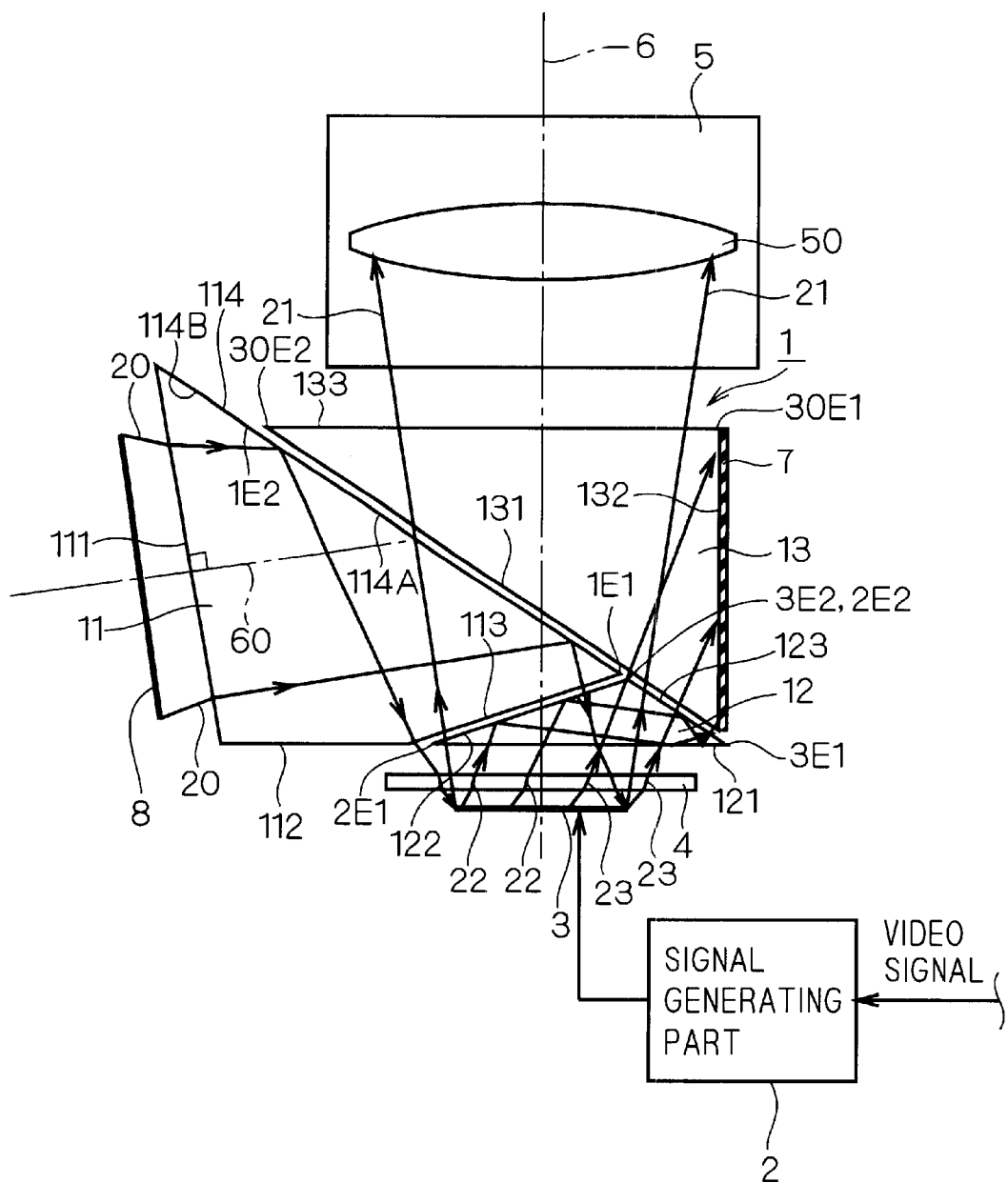
FIG. 1 is a schematic diagram illustrating a configuration of a prism according to a first preferred embodiment.

FIG. 1 is a diagram illustrating schematically a longitudinal section of a prism according to a first preferred embodiment, together with a block diagram of a signal generating part 2.

Referring to FIG. 1, an illuminating optical system is made up of four basic optical elements of a prism 1, variable mirror element 3, projection lens 5 and light source for illumination 8. Reference numeral 4 denotes a cover glass disposed above the variable mirror element 3.

Reference numeral 20 denotes an illuminating light ray that enters the prism 1 and illuminates the variable mirror element 3, numeral 21 denotes ON light reflected by the variable mirror element 3 (i.e., a bundle of first reflection state rays), numerals 22 and 23 denote light rays indicating the trail of OFF light reflected by the variable mirror element 3 (i.e., a bundle of second reflection state rays), numeral 6 denotes a projection optical axis parallel in the direction of the normal of the variable mirror element 3, and numeral 60 denotes an illuminating optical axis.

The variable mirror element 3, which is a reflection type light valve that is represented by DMD (Digital Micromirror Device), selects the direction of reflection of incident light by changing the inclination of each micromirror, thereby to provide the bundle of incident rays with a modulation based on an image information. That is, the reflected light is divided into ON light and OFF light, based on the image information.

The ON light 21 is light rays reflected toward the projection lens 5, and the outermost light ray entering the projection lens 5 is shown in FIG. 1. Reference numeral 50 illustrates schematically a lens part of the projection lens 5.

Each of the bundles of rays (i.e., the ON light 21) received by (incident on) the projection lens 5 provides a white indication state of image (corresponding to a bright point on a screen).

Each of the OFF light 22 and 23 is a bundle of rays which has a certain spread and is reflected in a direction inclined at a predetermined angle with respect to the projection optical axis 6. Most of the OFF light 22 and 23 reach a shading member 7 disposed on a side surface 132 of a third prism piece 13 and are then absorbed by the shading member 7.

Therefore, the OFF light 22 and 23 are not received by (do not enter) the projection lens 5, thereby each providing a black indication state of image (corresponding to a dark point on the screen).

Referring to FIG. 1, first to third prism pieces 11, 12, 13 are each disposed a predetermined micro-interval apart from the other two, as will be described hereafter, and all of the first to third prism pieces 11, 12, 13 constitute, as a whole, the prism 1 as a unitary article.

A first outer surface 111, fifth outer surface 112, fourth inner surface 113 and outer surface 114 including a first inner surface 114A, are planes by which the outer shape of the first prism piece 11 is characterized. A second outer surface 121, second inner surface 122 and third inner surface 123 are planes by which the outer shape of the second prism piece 12 is characterized. A fifth inner surface 131, fourth outer surface 132 and third outer surface 133 are planes by which the outer shape of the third prism piece 13 is characterized.

Referring again to FIG. 1, the first prism piece 11 of tetragonal cross-section, the second prism piece 12 of triangular cross-section, and the third prism piece 13 of right triangular cross-section are each a cube made up of planes wherein the sides corresponding to their respective prism pieces in FIG. 1, extend in a direction perpendicular to the plane of the drawing.

The prism 1 of FIG. 1 has the following structural features.

(I) The prism 1 has in its interior a first inner surface 114A, second inner surface 122, third inner surface 123, fourth inner surface 113 and fifth inner surface 131.

(I-a) The first inner surface 114A is part of the surface 114 and has a first end 1E1 spaced a first distance away from the variable mirror element 3. The first inner surface 114A is inclined to the projection optical axis 6 in a direction away from the variable mirror element 3, from the first end 1E1 to a second end 1E2. The first inner surface 114A has the optical properties that (i) it performs total reflection of a bundle of rays 20 externally entered, (ii) it allows the bundle of reflected rays 20 to propagate in the prism 1 toward the variable mirror element 3, and (iii) upon incidence of a bundle of first reflection state rays 21 after having passed through the second inner surface 122 and fourth inner surface 113, it allows the bundle of first reflection state rays 21 to pass therethrough and propagate in the prism 1 toward the projection lens 5. In order to meet such optical properties, the first inner surface 114A is coated with a dielectric multilayer film (not shown). The dielectric multilayer film is designed to transmit most quantity of light of the bundle of incident first reflection state rays 21 (for example, it can be designed to attain a 99% transmittance).

(I-b) The second inner surface 122 has a first end 2E1 and a second end 2E2 which are respectively spaced a second distance and a third distance greater than the second distance and smaller than the first distance, away from the variable mirror element 3. The second inner surface 122 has the optical properties that (i) upon incidence of the bundle of externally entered rays 20 subjected to total reflection on the first inner surface 114A, it allows the bundle of externally entered rays 20 to pass therethrough, (ii) upon incidence of a first bundle of rays 21 being in the first reflection state among bundles of rays which are irradiated to the variable mirror element 3 and then reflected thereby, it allows the first bundle of incident rays 21 being in the first reflection state to pass therethrough, and (iii) upon incidence of a first bundle of rays 22 being in a second reflection state different from the first reflection state, it performs total reflection of the first bundle of second reflection state rays 22. The second inner surface 122 is also coated with a dielectric multilayer film (not shown), in order to transmit most quantity of light of the bundle of first reflection state rays 21 incident upon the second inner surface 122 (e.g., a 99% transmittance).

The first distance, second distance, and third distance, as well as a fourth distance (described later) are each defined as a distance from the center of a reflecting surface of the variable mirror element 3 crossing the projection optical axis 6, to an object. It follows that:

(First distance)>(Third distance)>(Second distance), and (Second distance) <(Fourth distance)

Alternatively, the first to fourth distances are defined as the shortest distance, when an object is viewed from a plane including the reflecting surface of the variable mirror element 3. With this definition, it can be regarded as (Second distance)=(Fourth distance).

(I-c) The third inner surface 123 is flush with the first inner surface 114A, and has a first end 3E1 and a second end 3E2 which are respectively spaced the fourth distance and the third distance, away from the variable mirror element 3. The second end 2E2 of the second inner surface 122 corresponds to the second end 3E2 of the third inner surface 123. In other words, these surfaces 122 and 123 cross with each other, or are connected together, at the end 2E2 (3E2). The third inner surface 123 has the optical properties that (i) it allows a second bundle of first reflection state rays 21 that is incident thereon without entering the second inner surface 122, to pass therethrough and propagate toward the projection lens 6, and (ii) it allows a second bundle of second reflection state rays 23 that is incident thereon without entering the second inner surface 122, to pass therethrough. Further, the third inner surface 123 performs total reflection of the first bundle of second reflection state rays 22 that is incident thereon after the total reflection on the second inner surface 122, and it allows the first bundle of second reflection state rays 22 that is incident thereon after the total reflection on the second inner surface 122 and then another total reflection on the second outer surface 121. For the same purpose as described, the surface of the third inner surface 123 is also coated with a dielectric multilayer film (not shown).

(1-d) The fourth inner surface 113 is disposed in plane-parallel face-to-face relationship with the second inner surface 122, and has an optical property whereby most of the bundle of externally entered rays 20 that are incident thereon after the total reflection on the first inner surface 114A, and most of the first bundle of incident first reflection state rays 21, are allowed to pass therethrough. For the same purpose as described, the surface of the fourth inner surface 113 is also coated with a dielectric multilayer film (not shown).

(I-e) The fifth inner surface 131 is disposed in plane-parallel face-to-face relationship with the first inner surface 114A and third inner surface 123, and has an optical property of allowing the transmission of most of light rays that are incident thereon after exiting from the prism pieces 11 and 12. For the same purpose as described, the surface of the fifth inner surface 131 is also coated with a dielectric multilayer film (not shown).

(II) The prism 1 has the following outer surfaces of a first outer surface 111, second outer surface 121, third outer surface 133, fourth outer surface 132, fifth outer surface 112, and an exposed portion 114B of the surface 114.

(II-a) The first outer surface 111, which is disposed at a location opposed to the first inner surface 114A, is an entrance surface that allows the bundle of externally entered rays 20 to pass therethrough and propagate in the prism 1 toward the first inner surface 114A.

(II-b) The second outer surface 121 is disposed at a location opposed to the variable mirror element 3, second inner surface 122 and third inner surface 123, and it has a first end corresponding to the first end 2E1 of the second inner surface 122, and a second end corresponding to the first end 3E1 of the third inner surface 123. The second outer surface 121 is an optical action surface whereby (i) the bundle of externally entered rays 20 that is incident thereon after having passed through the second inner surface 122, is allowed to pass therethrough and travel toward the variable mirror element 3, and (ii) the bundles of rays 21, 22 and 23 reflected by the variable mirror element 3 are allowed to enter the prism 1.

(II-c) The third outer surface 133, which is a surface approximately parallel to the second outer surface 121, is disposed at a location opposed to the projection lens 5, and has a first end 30E1 located above the first end 3E1 of the third inner surface 123, and a second end 30E2 adjacent to the second end 1E2 of the first inner surface 114A. The third outer surface 133 is an exit surface whereby the first bundles of first reflection state rays 21 that are incident thereon after having passed through the first inner surface 114A, and the second bundles of first reflection state rays 21 that are incident thereon after having passed through the third inner surface 123, are allowed to pass therethrough.

(II-d) The fourth outer surface 132 is disposed at a location opposed to the first outer surface 111, first inner surface 114A, third inner surface 123 and fifth inner surface 131. The fourth outer surface 132 has a first end connected to the first end 30E1 of the third outer surface 133, and a second end that is located above and is adjacent to the second end 3E1 of the second outer surface 121.

(II-e) The fifth outer surface 112 is flush with the second outer surface 121, and it has a first end adjacent to the first end 2E1 of the second outer surface 121, and a second end connected to the first outer surface 111.

Except for the fourth outer surface 132 (Note that when the shading member 7 is provided above the fourth outer surface 132, the fourth outer surface 132 should be included, as will be described later.), the other outer surfaces 111, 121, 133, 112 and 114B are each coated with a dielectric multilayer film (not shown) for the same purpose as described.

Thus, in the interior of the prism 1 bounded by the second outer surface 121 and third outer surface 133, the second inner surface 122, fourth inner surface 113, first inner surface 114A and fifth inner surface 131 are arranged successively, and also the third inner surface 123 and fifth inner surface 131 are arranged successively, in a direction away from the variable mirror element 3 toward the projection lens 5.

Note that light rays indicated by arrows in FIG. 1 denote the loci of the light rays contained in a plane parallel to the drawing (i.e., meridional plane).

Optical action of the above-mentioned illuminating optical system will be described by referring to FIG. 1 and following drawings.

Deflection Action

Referring now to FIG. 1, a deflection action to light incident on the prism 1 will be described hereafter.

Illuminating light rays 20 that illuminate the variable mirror element 3 enter the first prism piece 11 from the surface 111 perpendicular to an illuminating optical axis 60 (i.e., a first surface, namely, an entrance surface that allows entrance of a bundle of rays entering from the exterior).

The outer surface 114 of the first prism piece 11 (i.e., a second surface which is disposed away from the variable mirror element 3, as a first reflecting surface) is located parallel to the surface 131 of the third prism piece 13 (i.e., a seventh surface), via a micro air gap as will be described later. The illuminating light rays 20 pass through the first prism piece 11 to the surface 114, and is then subjected to total reflection on the interface between the air gap and the surface 114.

That is, the surface 114 is so inclined to the illuminating optical axis 60 that the incident illuminating light rays 20 effect total reflection.

Part of the illuminating light rays 20 deflected by total reflection on the surface 114 transmit the adjacent second prism piece 12, and then exit from the prism 1 and reach the variable mirror element 3.

The cover glass 4 can be regarded as an optical plane parallel plate. Therefore, it is regarded here as an element for merely changing an optical path length, and its detail description is omitted.

The surface 113 of the first prism piece 11 (i.e., a third surface) is also disposed in plane-parallel face-to-face relationship with the surface 122 of the second prism piece 12 (i.e., a fourth surface, which is disposed in proximity to the variable mirror element 3, and functions as a second reflecting surface), via a micro air gap as described later. Accordingly, part of the illuminating light rays 20 after having been subjected to total reflection on the surface 114 pass through an air layer between the surface 113 of the first prism piece 11 and the surface 122 of the second prism piece 12.

Strictly speaking, by the presence of the air layer (the air layer within the air gap), the illuminating light 20 is refracted and the direction of travel of the illuminating light 20 is slightly deviated from the straightforward direction. However, it is designed so that the air layer has a thickness of about several μm and is substantially constant in the direction in which the surfaces 113 and 122 extend. Thereby, the influence of the refraction can be substantially ignored.

Further, the surface 112 of the first prism piece 11 is located flush with or substantially flush with the surface 121 of the second prism piece 12 (i.e., a fifth surface, which allows a bundle of rays entering from the surface 111 that allows the entry of externally entered light, to be emitted as a bundle of rays to be irradiated to the variable mirror element 3, and which also functions as an optical action surface that allows the entry of the reflected light from the variable mirror element 3). Therefore, it can be considered that the behavior of the light 20 that exits from the prism 1 and travels to the variable mirror element 3, remains the same irrespective of the position of exit.

That is, when the prism 1 is viewed with respect to the deflection action of the prism 1, a prism of triangle cross-section may be assumed in which the first prism piece 11 and the second prism piece 12 are integral with each other.

Light Selection Action

Light selection action of the prism 1 will be described hereafter.

The variable mirror element 3 can produce two different reflection states, namely, the first and second reflection states as described earlier.

In the first reflection state, the variable mirror element 3 reflects incident illuminating light 20 to the projection lens 5. In FIG. 1, the ON light (each of bundles of first reflection state rays) 21 passes through the prism 1 approximately linearly and reaches the projection lens 5.

As shown in FIG. 1, it is highly possible that the ON light 21 passes through all the air layers (air gaps) that are present between the face-to-face surfaces in three prism pieces, which constitute the prism 1, namely, the first to third prism pieces 11 to 13.

Each of these air layers (air gaps), however, has about several μm thickness (a distance between surfaces), the thickness being approximately constant, as will hereafter be described. In addition, the opposed surfaces making up the air layer are located parallel to one another. These features enable to minimize the influence of refraction to be exerted on the ON light 21 whenever it passes through the air layer.

Of course, the following arrangements are made. Firstly, the outer surface 114 of the first prism piece 11 is flush with the surface 123 of the second prism piece 12 (i.e., a sixth surface). Secondly, the outer surface 112 of the first prism piece 11 is flush with the outer surface 121 of the second prism piece 12. Thirdly, each of the outer surfaces 112 and 121 is substantially parallel to the outer surface 133 of the third prism piece 13 (i.e., an eighth surface, which also functions an exit surface substantially parallel to the surface 121 that allows a bundle of rays from the variable mirror element 3 to be emitted as a bundle of rays travelling to the projection lens 5.).

As above discussed, of the three prism pieces 11, 12 and 13 constituting the prism 1, one of the first and second prism pieces 11 and 12 (e.g., the first prism piece 11) has two surfaces opposed to the other two prism pieces (e.g., the second and third prism pieces 12 and 13) with an air gap therebetween. The above-mentioned first or second reflecting surface 114 or 122 corresponds to one of the two opposed surfaces.

It can therefore be considered that when viewed macroscopically, the ON light 21 passes through an optical plane parallel plate disposed between the variable mirror element 3 and projection lens 5.

In the second reflection state, the illuminating light 20 exits (is reflected and deflected), across the projection optical axis 6, to the opposite side of the entrance direction of the illuminating light 20, and then travels as OFF light (i.e., a first bundle of second reflection state rays) 22 or OFF light (i.e., a second bundle of second reflection state rays) 23, as shown in FIG. 1.

These OFF lights 22 and 23 are light rays falling outside the light receiving angle of the projection lens 5. Thus, in the second reflection state, video light projected on the screen corresponds to an OFF state or black indication.

In this state, the OFF light 22 is totally reflected on the surface 122 of the second prism piece 12, and its travel direction is greatly deflected to the right as seen in FIG. 1.

That is, the outer surface 122 of the second prism piece 12 is located inclined at a predetermined angle to the projection optical axis 6, so that it performs total reflection of light rays whose angle of incidence exceeds a certain degree (the angle satisfying total reflection condition).

The OFF light 22 after having been totally reflected on the surface 122 propagates through the second prism piece 12 to the right as seen in FIG. 1. Part of the OFF light 22 reaches the surface 121 and, since the angle of incidence at this time is extremely large, it is again subjected to total reflection on the surface 121, and propagates through the second prism piece 12 to the right in FIG. 1. In addition, the OFF light 22 that has been subjected to the total reflection on the surface 122 and then directly reached the surface 123, is totally reflected on the surface 123 because its angle of incidence at this time is extremely large, and then reaches the surface 121. Since the angle of incidence at this time is not so large, part of the OFF light 22 is reflected by the surface 121 and reaches the surface 123 again. Thus, part of the OFF light 22 after having been totally reflected on the surface 122 exists from the surface 121 toward the exterior, while the remaining OFF light 22 passes through both of the surfaces 123 and 131 to reach the outer surface 132 of the third prism piece 13. The OFF light 23 also passes through the two surfaces 123 and 131, and then reaches the surface 132. Hence, the shading member 7 is provided on the surface 132, in order to absorb the OFF lights 22 and 23.

Due to this construction, most of the OFF lights 22 and 23 cannot enter (are not received by) the projection lens 5. This enables to reduce the occurrence of ghost light due to scattering on the lens-barrel inner surface or lens surfaces (e.g., the exposed surface or boundary surface) of the projection lens 5. Thereby, an improvement in contrast can be realized by suppressing the light output mainly in the state of black indication on the screen.

The illuminating light 20 which propagates through the first prism piece 11 before it reaches the outer surface 114 of the first prism piece 11, does not impinge upon the surface 113 of the first prism piece 11. Therefore, the surface 122 of the second prism piece 12 can be arranged at a position at which it is able to perform total reflection of the OFF light 22 reflected by the variable mirror element 3. In addition, the air layer (air gap) between the surface 113 of the first prism piece 11 and the surface 122 of the second prism piece 12, does not substantially affect the illuminating light 20 and ON light 21. Accordingly, in the prism 1, the OFF lights 22 and 23 can be guided effectively to the shading member 7.

Examples of Prism Designs

In order that the effect of improved contrast of the prism 1 is described more concretely, an example of design of the prism 1 will be illustrated to make a qualitative examination. Now assume that the variable mirror element 3 is a DMD, one example of the prism 1 in accordance with the aforementioned DMD's characteristic will be illustrated (hereinafter, as an example of the variable mirror element 3, one using the DMD will be shown and referred to as "DMD 3").

Design of the prism 1 can be roughly divided into two categories: the design of prism pieces on the DMD 3 side (i.e., the first and second prism pieces 11 and 12), namely, the design of prism pieces on the illuminating light side; and the design of a prism piece on the image light side (i.e., the third prism piece 13).

Figure 2:
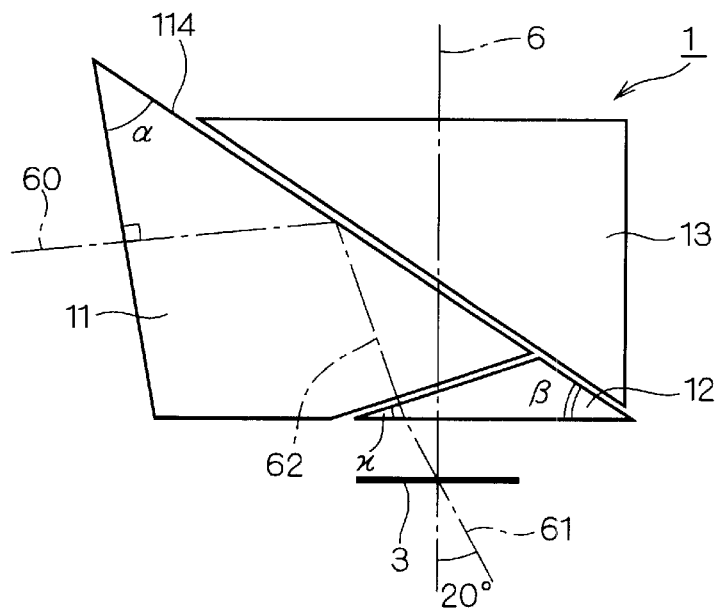
FIG. 2 is a schematic diagram illustrating a design parameter in designing prisms.

FIG. 2 is a schematic diagram illustrating a design parameter in designing the prism 1. In FIG. 2, reference numeral 61 denotes an illuminating optical axis related to the DMD 3, numeral 62 denotes an illuminating optical axis within the first prism piece 11, which has been subjected to total reflection on the outer surface 114 of the first prism piece 11, and α and β denote apex angles by which the shape of the prism 1 is characterized.

Other reference numerals are common to those in FIG. 1, and description thereof is thus omitted. Note that the following description will be made by letting the angle formed by the projection optical axis 6 and illuminating optical axis 61 be 20°.

Firstly, assume that on the DMD 3 side, the first prism piece 11 is integral with the second prism piece 12, the apex angles a and β on a meridional plane (on the drawing) are found to design a prism satisfying the illuminating condition of the DMD 3.

For the design conditions of apex angles α and β the following two conditions must be met:
i) All the illuminating light rays incident on the prism 1 are deflected to the DMD 3 because they satisfy the total reflection condition on the outer surface 114 of the first prism piece 11, and the bundle of illuminating rays exiting from the prism 1 illuminates the DMD 3 at an angle of approach of 20°.
ii) Reflected light rays (ON light) travelling from the DMD 3 to a projection lens (not shown) are all transmitted through a totally reflection surface.

Figure 3:
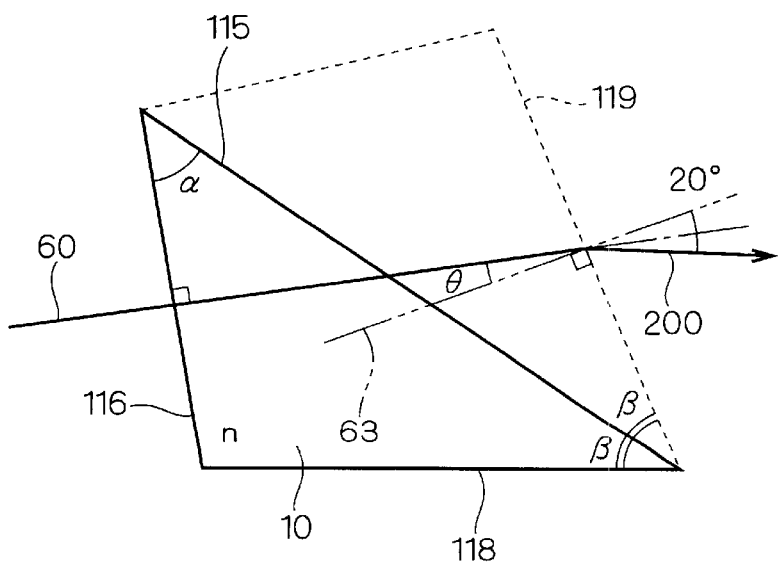
FIG. 3 is a schematic diagram illustrating a light ray behavior, assuming a virtual cube.

As to the condition i), its solution can be obtained easily by assuming a wedge-shaped prism as shown in FIG. 3.

FIG. 3 is a schematic diagram illustrating a behavior of light rays when a virtual cube is assumed. In FIG. 3, there is shown a prism piece 10 in which the first and second prism pieces 11 and 12 of FIG. 2 are integral with each other, and, there is shown, in dotted line, the contour of the cube when the prism piece 10 is reversed so as to be symmetrical about the totally reflection surface 115.

In setting the apex angles α and β, a wedge-shaped virtual prism may be considered which is formed by the prism piece 10 and the dotted line. In FIG. 3, reference numeral 200 indicated by solid arrow denotes the behavior of light ray entering perpendicularly with respect to the entrance surface 116 of the prism piece 10.

A substantial exit surface of the prism 10 is a surface 118, and a surface 119 is a virtual exit surface of a virtual prism that corresponds to the substantial exit surface 118.

Since the angle formed by the projection optical axis 6 and illuminating optical axis 61 is set to 20°, it is assumed that light rays exiting from the virtual exit surface 119 are inclined at an angle of 20° to a normal 63 of the virtual exit surface 119. Letting the angle of incidence to the virtual exit surface 119 be θ, among α, β and θ, the following relational expression (1) holds.

$$\theta = \alpha - \beta = \sin^{-1}\left(\frac{\sin 20°}{n}\right) \quad (1)$$

wherein n is a refractive index of the material used for the prism piece 10.

Total Reflection Condition on Prism Pieces

Next there will be found a condition where all light rays incident on the prism piece 10 are totally reflected.

FIG. 4 is a schematic diagram illustrating a total reflection condition for light rays. In FIG. 4, a solid arrow indicated by reference numeral 201 denotes the outermost angular light ray that enters the totally reflection surface 115 at the smallest incident angle, in the light rays entering the prism piece 10. If the outermost angular light ray satisfies the total reflection condition, it follows that all the incident rays are totally reflected.

In FIG. 4, γ denotes an angle formed by the light ray 201 and the normal 64 to the totally reflection surface 115, that is, an angle of incidence to the totally reflection surface 115. Here, by angle δ in FIG. 4, the F-number of the bundle of illuminating rays can be expressed in equation (2).

$$F\text{-}number = \frac{1}{2\sin\delta} \quad (2)$$

Then, by the angle of incidence γ to the totally reflection surface 115 of the light ray 201, and the refraction of a light ray on the entrance surface 116, the following equation (3) holds.

$$\sin \delta = n \sin(\alpha - \gamma) \qquad (3)$$

Since the incident light ray 201 satisfies the total reflection condition on the totally reflection surface 115, the following equation (4) holds.

$$\sin \gamma \geq \frac{1}{n} \qquad (4)$$

From equation (3) and equation (4), the following equation (5) holds.

$$\alpha \geq \sin^{-1}\left(\frac{\sin\delta}{n}\right) + \sin^{-1}\left(\frac{1}{n}\right) \qquad (5)$$

Note that $\alpha$ is defined as $\alpha_1$, particularly when both sides of equation (5) become equal.

It is necessary not only that the bundle of rays for illuminating the DMD 3 is totally reflected on the totally reflection surface 115, but also that all the light rays pass through the virtual exit surface 119 of FIG. 3 (This is the condition to ensure that the DMD 3 is reliably illuminated with the illuminating light.).

FIG. 5 illustrates a behavior of a light ray 202 in the light rays incident on the entrance surface 116, which enters the opposite side of that in FIG. 4, with respect to the illuminating optical axis 60, at an angle of $\delta$.

In FIG. 5, $\omega$ denotes an angle formed by the light ray 202 and the normal 63 of the virtual exit surface 19, that is, an angle of incidence to the virtual exit surface 119.

Since the light ray 202 enters the virtual exit surface 119 at the largest angle $\omega$, it should be avoided that total reflection occurs there and the light ray is enclosed in the prism piece 10. In this event, firstly, about angle co, the following equation (6) holds.

$$\omega = \alpha - \beta + \sin^{-1}\left(\frac{\sin\delta}{n}\right) = \sin^{-1}\left(\frac{\sin 20°}{n}\right) + \sin^{-1}\left(\frac{\sin\delta}{n}\right) \qquad (6)$$

A condition where no total reflection occurs on the virtual exit surface 119, can be expressed in the following equation (7).

$$\sin\omega < \frac{1}{n} \qquad (7)$$

Thereby, from equation (6) and equation (7), the following equation (8) holds.

$$\sin^{-1}\left(\frac{\sin 20°}{n}\right) + \sin^{-1}\left(\frac{\sin\delta}{n}\right) < \sin^{-1}\left(\frac{1}{n}\right) \qquad (8)$$

Figure 6:
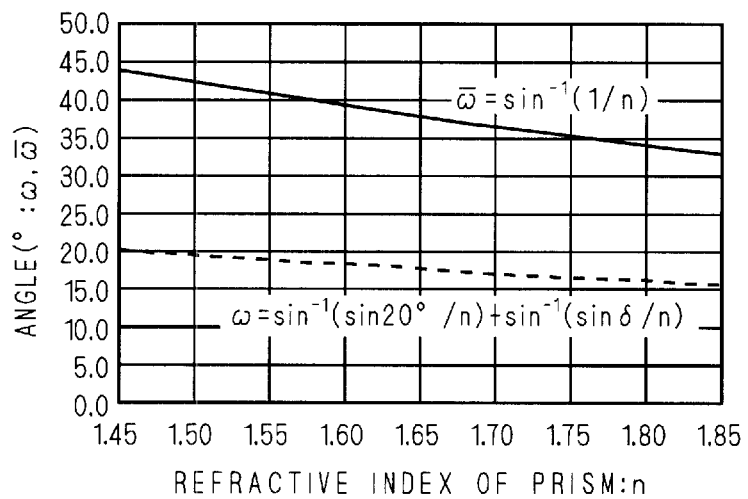
FIG. 6 is a graph that plots the relationship of an inequality expressed in an equation.

FIG. 6 is a graph that plots each side as a function of refractive index n, based on equation (8), wherein the F-number of illuminating light defined by equation (2), is 3. In FIG. 6, the function of refractive index n corresponding to the left side of equation (8) is indicated by broken line, and that of the right side is indicated by solid line.

With reference to the graph of FIG. 6, it will be noted that the inequality of equation (8) holds in the range of 1.45 to 1.85, which is the range of the refractive index of usual optical materials.

Conditions of Prism Apex

Conditions of prism apexes $\alpha$ and $\gamma$ will be found by the behavior of the ON light travelling from the DMD 3 to the projection lens.

Figure 7:
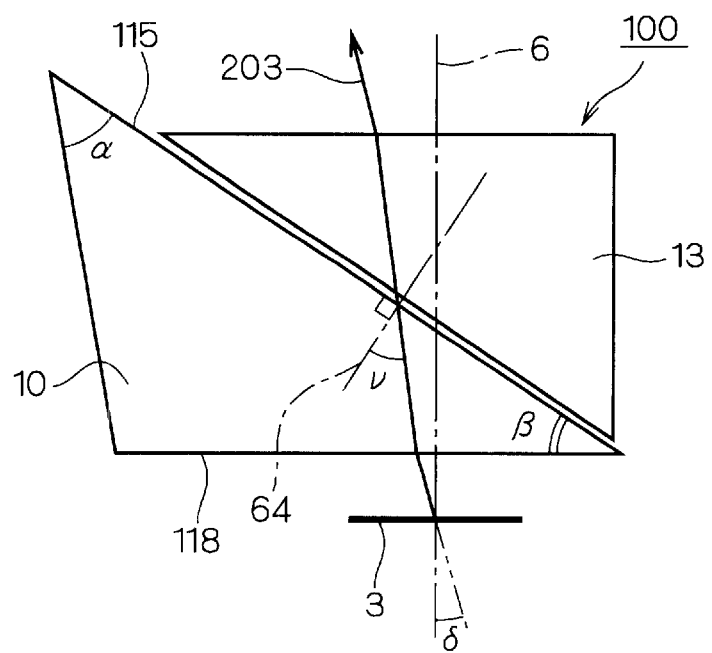
FIG. 7 is a schematic diagram illustrating the behavior of light rays passing through a prism consisting of two prism pieces.

FIG. 7 illustrates a prism 100 made up of two prism pieces 10 and 13, as well as a light ray 203 in the ON light from the DMD 3 which enters the totally reflection surface 115 at the largest angle of incidence v. In FIG. 7, reference numeral 64 denotes the normal of the totally reflection surface 115, and other numerals have been retained for similar parts in the foregoing drawings.

When the light ray 203 is not subjected to total reflection on the totally reflection surface 115, and travels to the prism piece 13, all video light rays from the DMD 3 travel to the prism piece 13. First, about the angle of incidence v, the following equation (9) holds.

$$v = \beta + \sin^{-1}\left(\frac{\sin\delta}{n}\right) = \alpha + \sin^{-1}\left(\frac{\sin\delta}{n}\right) - \sin^{-1}\left(\frac{\sin 20°}{n}\right) \qquad (9)$$

Like equation (7), a condition where no total reflection occurs can be expressed in the following equation (10).

$$\sin v < \frac{1}{n} \qquad (10)$$

From equation (9) and equation (10), the following inequality (11) is obtained.

$$\alpha < \sin^{-1}\left(\frac{\sin 20°}{n}\right) + \sin^{-1}\left(\frac{1}{n}\right) - \sin^{-1}\left(\frac{\sin\delta}{n}\right) \qquad (11)$$

Here, on the assumption that both sides of equation (11) are equal, $\alpha$ is defined as $\alpha_2$.

From above, there are derived the conditional expressions about apex angels $\alpha$ and $\beta$ that define a basic shape of the prism 10. In this case, the shape of the prism 10 may be determined by finding an apex angle a satisfying both conditions of equations (5) and (11), and finding $\alpha$ from equation (1).

Figure 8:
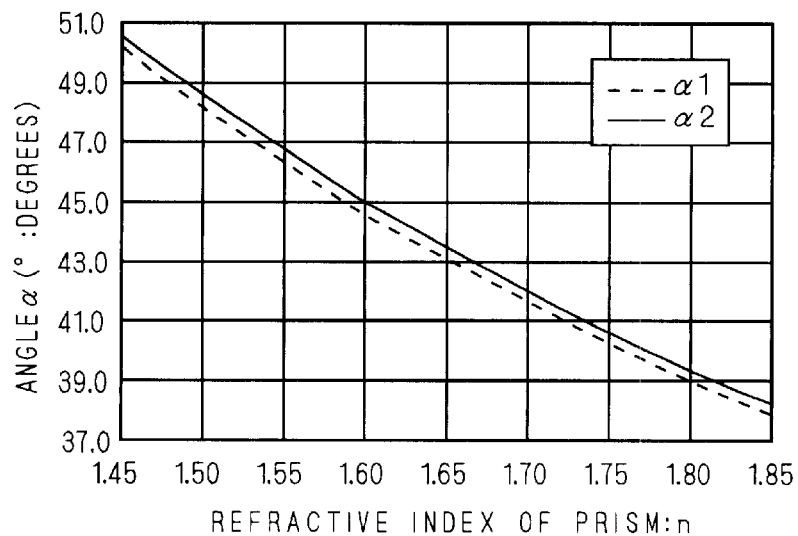
FIG. 8 is a graph that plots the relationship of two inequalities.

FIG. 8 is a graph that plots an angle $\alpha_1$ obtained by equation (5) and an angle $\alpha_2$ obtained by equation (11), as a function of refractive index n of a prism material, and the abscissa axis and ordinate axis of FIG. 8 represent a refractive index of a prism material and an angle, respectively.

From the relationship between the ranges expressed in the two inequalities of equations (5) and (11), the value of the apex angle $\alpha$ can be selected from the range that is sandwiched by the dotted line indicating angle $\alpha_1$ and the solid line indicating angle $\alpha_2$ (i.e., the range of angle selection to be described later).

As can easily be understood with reference to FIG. 8, in the range of 1.45 to 1.85, which is the refractive index range of practical optical materials, an optimum value of an apex angle $\alpha$ can be selected in the range of about 38.0 to about 50.4°

In this case, an apex angle $\beta$ can be easily made equivalent from equation (1), and an optimum value of angle $\beta$ can be selected in the range of about 25.0° to about 38.0°.

As a practical concrete example, when the material of the prism 10 is BK7 ($n_d$=1.5168), the F-number of a bundle of rays for illuminating the DMD 3 is 3, and the angle formed by the illuminating optical axis of the DMD 3 and the normal of the DMD 3 is 20° as described above (i.e., this is equivalent to that the illuminating light illuminates the DMD 3 at an angle of approach of 20°), an optimum apex angle $\alpha$ may be selected in the range of 47.55° to 47.97°. At this time, an angle β obtained from equation (1) can fall within the range of 34.52° to 34.94°.

Figure 9:
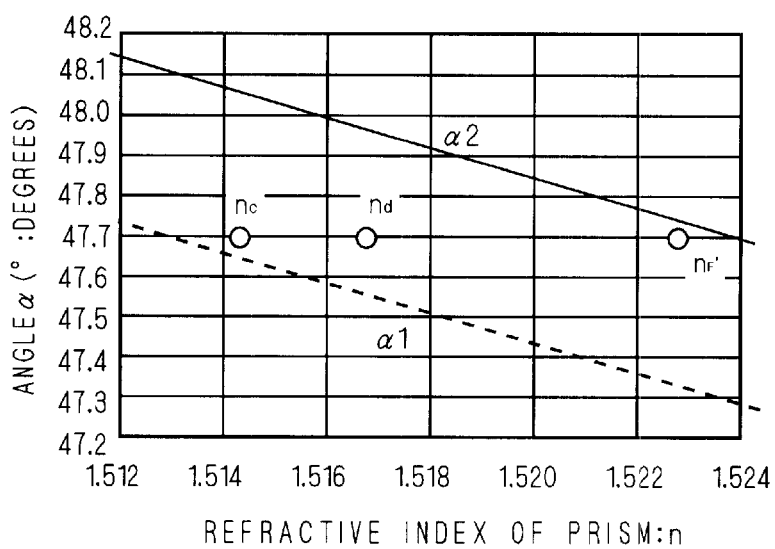
FIG. 9 is a graph showing the wavelength dispersion dependency of an apex angle.

FIG. 9 is a graph that plots the values of respective apex angles α for the C line (656.27 nm; the refractive index at this wavelength is expressed by $n_c$), for the d line (587.56 nm; the refractive index at this wavelength is expressed by $n_d$), and for the F' line (479.99 nm; the refractive index at this wavelength is expressed by $n_{F'}$), while taking into consideration a wavelength dispersion in the material of the prism 10 (BK7 is used here). The abscissa and ordinate axes of this graph are the same as FIG. 8.

Thus, when the wavelength dispersion of the material of the prism 10 is taken into consideration, it can be understood that α≠47.7° is suitable, and it follows β≠34.7°. Without limiting this value, if an anticipated range of refractive index due to wavelength dispersion of the material falls within the range of angle selection shown in FIG. 8, a suitable prism material can be selected from ones which are in the region of visible rays and also have a refractive index of about 1.45 to 1.85.

In the meanwhile, the design of the prism piece 13 shown in FIG. 1 or FIG. 7, remains the same whether the prism on the DMD 3 side is made up of a single prism piece, or a complex made up of a plurality of prism pieces. As shown in FIG. 1, the surface 133 of the third prism piece 13 is parallel to the surface 121 of the second prism piece 12. It can therefore be considered that a relatively thick glass plate is disposed between the DMD 3 and projection lens 5. As a result, the design of the projection lens 5 can be made very simple because the prism 1 is configured by the plane parallel plate comprised the surfaces perpendicular to the projection optical axis 6.

Figure 10:
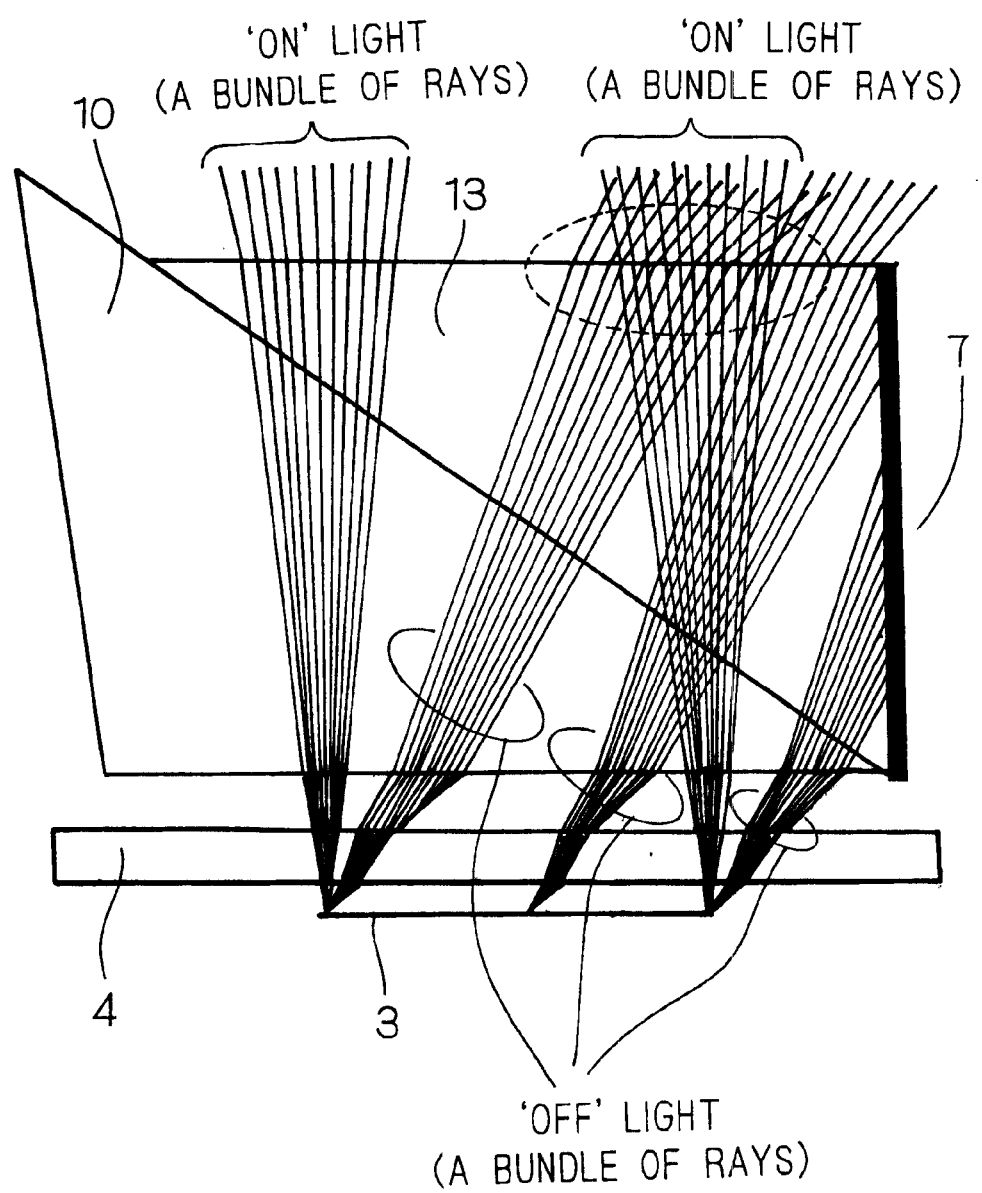
FIG. 10 is a diagram of a light ray tracing using a prism consisting of two prism pieces.

FIG. 10 illustrates the loci of light rays when the reflected light from the DMD 3 is allowed to enter the prism 10 made up of two prism pieces, based on the above design. FIG. 10 plots ON light travelling with a predetermined spread in the direction of the normal of the DMD 3, and OFF light travelling in the direction inclined at a predetermined angle to the normal of the DMD 3.

Although the shading member 7 is provided on the side surface of the prism 13, it is highly possible that the OFF light that reaches the vicinity of the ellipse indicated by dotted line in FIG. 10, directly enters the projection lens.

The reason for this is that, in order to increase the quantity of light in the screen's periphery, a telecentric lens is often used as the projection lens of a projector and, because such a telecentric lens receives (allows the entrance of) all the ON light rays shown in FIG. 10, one having a large lens aperture is often used, thereby causing a situation where OFF light can enter the projection lens easily.

Description will now be given of the case that a light ray tracking by means of a computer simulation using one telecentric lens, is made to examine situations where OFF light enters the projection lens.

Figure 11:
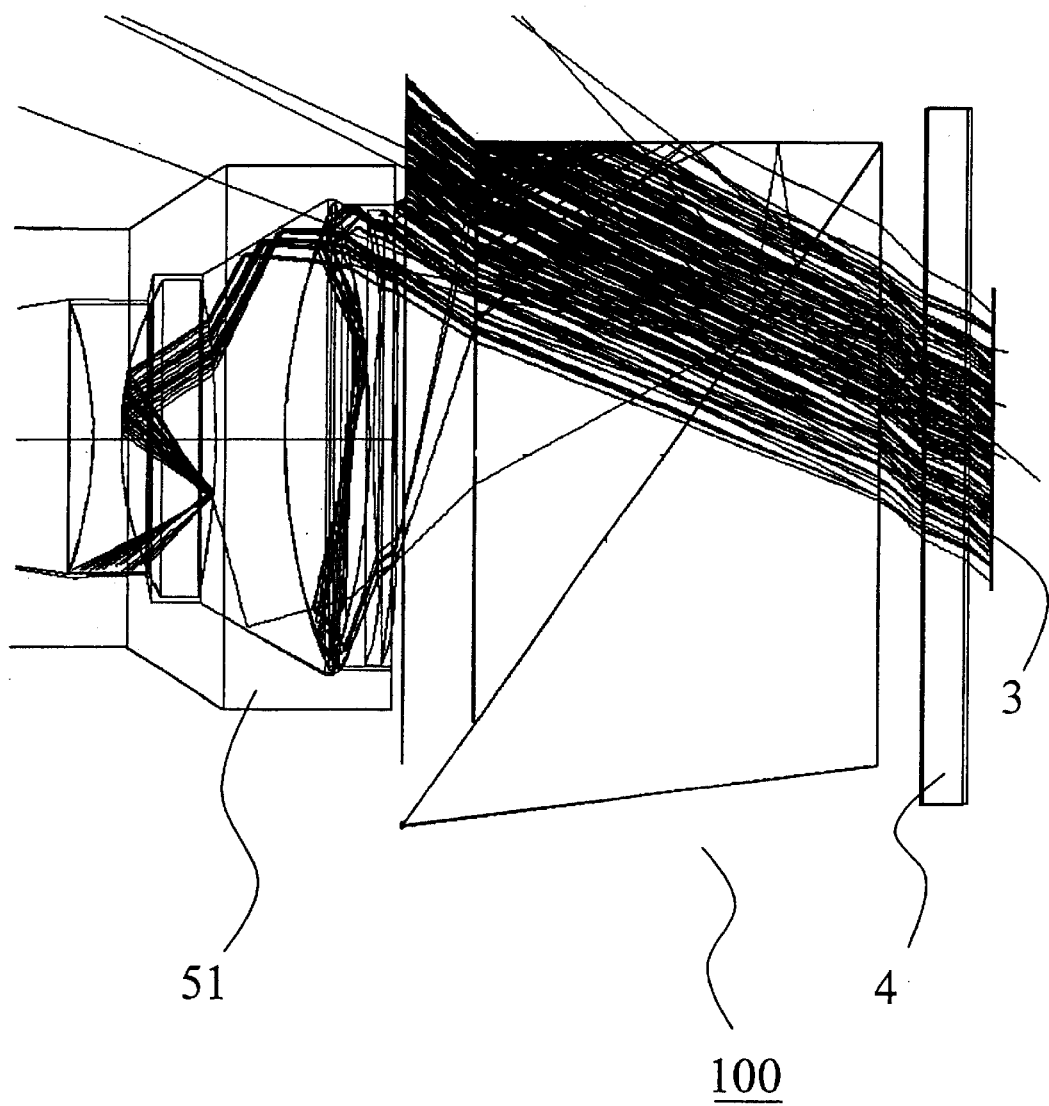
FIG. 11 is a diagram of output of a computer simulation in order to examine the unwanted light entering a projection lens in a prism consisting of two prism pieces.

FIG. 11 is a diagram illustrating output of a computer simulation in the case of an optical system in which a telecentric lens 51 having an F-number of 3, is disposed immediately behind the prism 100, and also illustrating parts necessary for description in enlarged dimension.

With reference to FIG. 11, it will be noted that part of the OFF light from the DMD 3 enters the projection lens 51 and then travels through the projection lens 51, while reflection is repeated on the surfaces of inner lenses that form the projections lens 51.

In the case shown in FIG. 11, the number of the light rays of the OFF light is reduced to simplify an understanding, and it seems that they exert less influence. In practice, however, more unwanted OFF light rays may enter the projection lens 51.

In accordance with the principle, the light rays entering at an angle greater than the F-number of the projection lens 51, should be absorbed by a plane of stop within the lens, or the inner surface of the lens-barrel of the projection lens 51, thereby failing to reach a projection image plane (screen).

However, the photo-absorption on the plane of stop or the inner surface of the lens-barrel is actually not perfect (i.e. an imperfect absorber), and an anti-reflection coating applied to each lens surface is not perfect (i.e., an imperfect prevention of reflection). Due to these causes, the fact is that stray light takes place at various positions and the stray light reaches the screen to lower the contrast of an image to be projected.

Therefore, if it is able to prevent the OFF light travelling through the projection lens 51, a great improvement in contrast of images projected can be attained directly.

Design of Prism Pieces

Description will now be given of a method of designing a prism piece 12 (see FIG. 1) which acts effectively on OFF light that is most likely to travel through a projection lens.

For designing such a prism piece 12, it is necessary to examine the behavior of the OFF light reflected by the DMD 3, and the behavior of light rays that enter the prism piece 12 and then reach the totally reflection surface of the prism piece 12.

Figure 12:
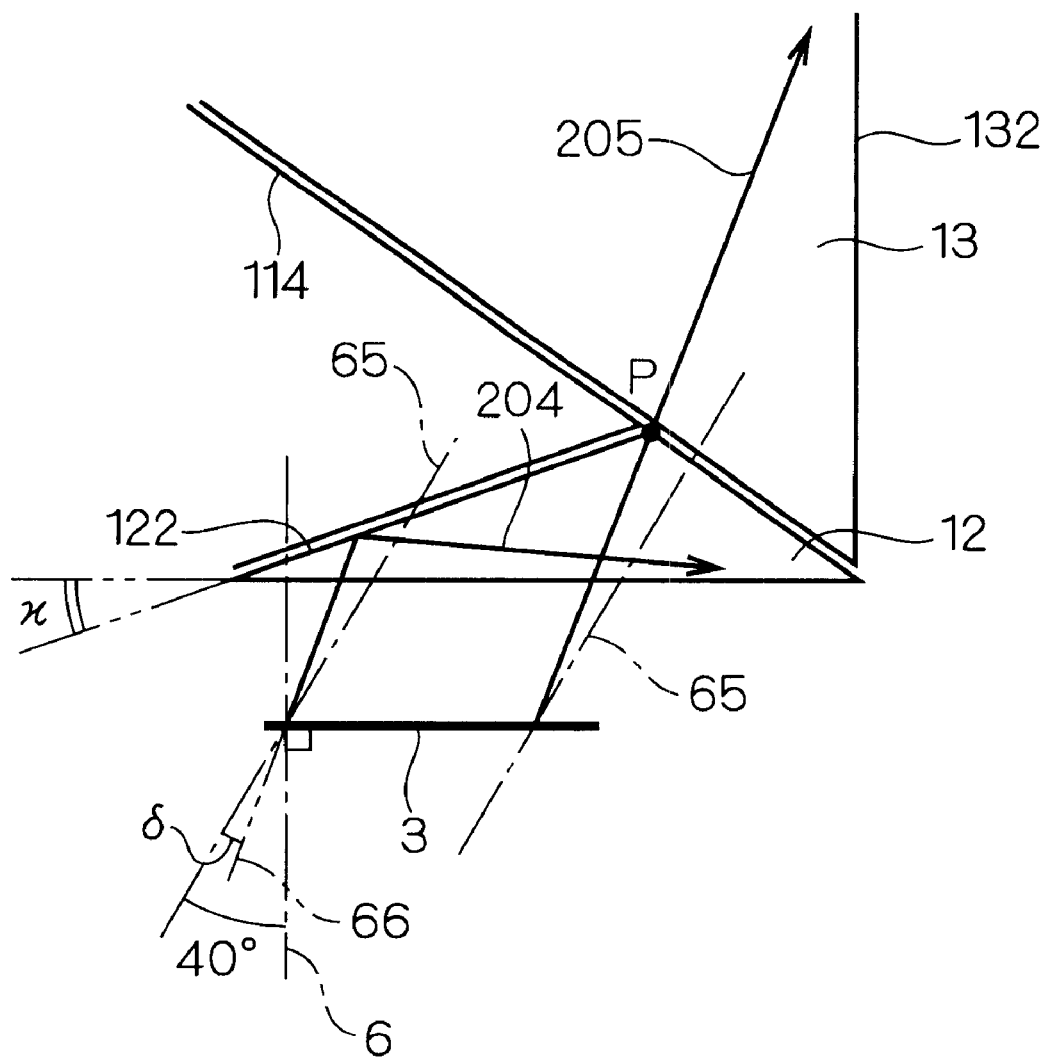
FIGS. 12 and 13 are schematic diagrams illustrating operation of a prism piece.

FIG. 12 is a schematic diagram illustrating the behavior of the OFF light reflected by the DMD 3. Light ray 204 is a light ray reflected by the leftmost end of the DMD 3 as seen in FIG. 12. Specifically, the light ray 204 is inclined outwardly (toward the normal 6 to the DMD 3) at an angle of δ from an optical axis 65 of the OFF light that exits at an angle of 40° from the normal 6 to the DMD 3. (It should be noted that the normal to the DMD 3 is defined herein as the normal 6 for convenience since a projection optical axis 6 matches the normal to the DMD 3 in this case.)

Reference numeral 66 denotes a directional axis of the light ray 204, numeral 205 denotes a light ray passing through a point P which is present on a reflection surface 122 and defines the position of the surface 122.

The bundle of OFF light rays that is reflected by the left end of the DMD 3 in FIG. 12, and then enters the prism piece 12, has a distribution that extends at an angle of δ about the optical axis 65, from side to side as seen in FIG. 12. Then, if the OFF ray 204 can be totally reflected on the reflection surface 122 of the prism piece 12, all the reflected rays having an angle other than that, will be totally reflected on the reflection surface 122 and then travel to the right as seen in FIG. 12. Therefore, based on the above total reflection condition, it is able to find the necessary value of an apex angle κ of the prism piece 12.

Figure 13:
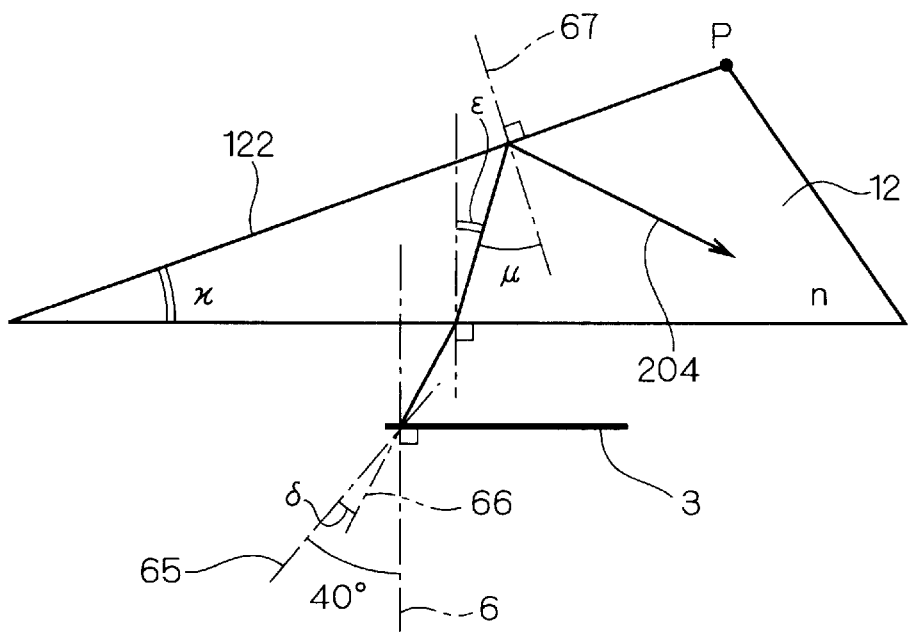

FIG. 13 shows the prism piece 12 in enlarged dimension. Referring to FIG. 13, one way of deriving an apex angle κ will be described. In FIG. 13, reference numeral 67 denotes a normal of the reflection surface 122.

An angle ε formed between the light ray 204 when it enters the prism piece 12, and the normal 6 of the DMD 3, can be expressed in the following equation (12).

$$\varepsilon = \sin^{-1}\left(\frac{\sin(40° - \delta)}{n}\right) \quad (12)$$

Among angles ε, κ and μ, the relationship expressed in the following equation (13) holds.

$$\varepsilon + \kappa = \mu \quad (13)$$

Here, under the total reflection condition of the light ray 204, angle μ is required to satisfy the following equation (14).

$$\sin\mu \geq \frac{1}{n} \quad (14)$$

Thereby, from equations (12), (13) and (14), the following inequality holds.

$$\kappa \geq \sin^{-1}\left(\frac{1}{n}\right) - \sin^{-1}\left(\frac{\sin(40° - \delta)}{n}\right) \quad (15)$$

Figure 14:
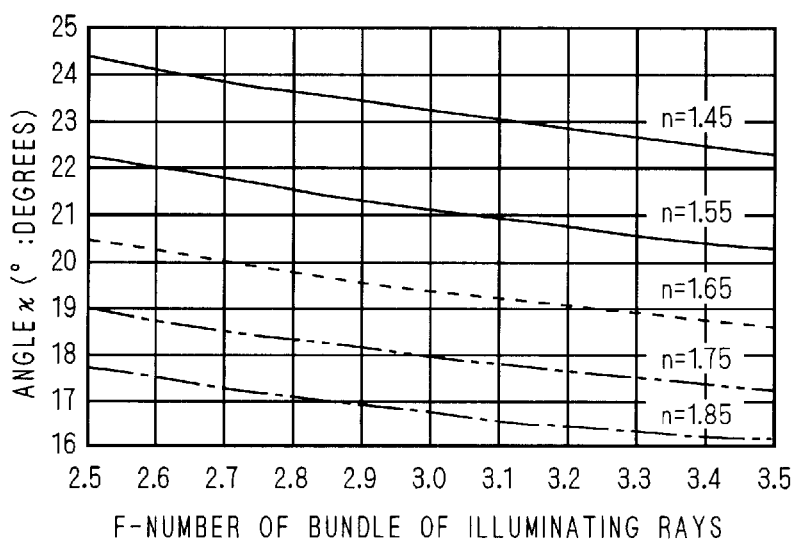
FIG. 14 is a graph showing the relationship between an apex angle of a prism piece and an F-number of a bundle of illuminating rays.

FIG. 14 is a graph that plots the result of a calculation obtained in the following manner that a refractive index n of the material of the prism 12 is used as a parameter, and the value of apex angle κ to the F-number of a bundle of illuminating rays is calculated based on equation (15).

With reference to FIG. 14, it will be noted that a value in the range of about 16.2° to about 24.5° is taken as a minimum value of apex angle κ, in the range of a practical refractive index of the material of the prism 12, namely, from 1.45 to 1.85.

As a practical case, when the material of the prism 12 is BK7 ($n_d$=1.5168), and the F-number of a reflected light ray from the DMD 3 is 3, the minimum value of apex angle κ to be found from equation (15) is about 21.753°.

In the meanwhile, there is no need that the OFF rays from the DMD 3 are all incident on the reflection surface 122. That is, like the light ray 204 shown in FIG. 12, only the light rays which are most likely to travel through the projection lens without reaching the side surface 132 of the prism piece 13, are required to be reflected.

As to the prism piece 11 of FIG. 1, however, attention should be given to the location of an air gap (air clearance) disposed between the prism pieces 11 and 12, because if the light ray 20 shown in FIG. 1 reaches the surface 113 before it reaches the totally reflection surface 114, part of the bundle of illuminating rays is rejected and broken off.

On the other hand, it is desired that a light ray 205 passing through the point P in FIG. 12, reaches the side surface 132 (preferably, a shading member is provided thereon). This can be realized under condition that the light ray 204 emitted from the leftmost end of the DMD 3 as seen in FIG. 12, is reflected by the reflection surface 122.

Method of Finding Point P

A method of finding the position of point P will be described by referring to one example shown in FIG. 15.

Figure 15:
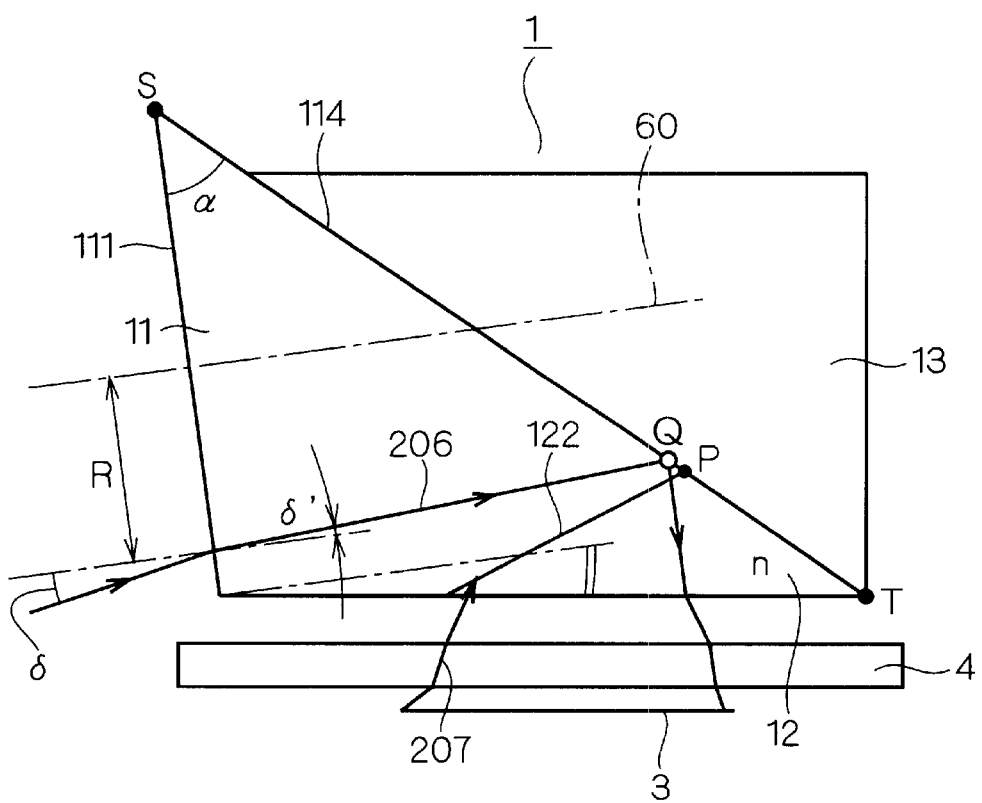
FIG. 15 is a schematic diagram illustrating a method of determining the coordinate of a point that defines a prism piece.

In FIG. 15, R denotes a radius of the bundle of rays incident on the entrance surface 111 of the prism 1, and Q denotes a point at which an outermost light ray 206 of the bundle of incident rays reaches the reflection surface 114.

Since an angle of refraction δ' in the prism 1 is known, if obtained a distance from an apex S making the apex angle α, to the illuminating optical axis 60, the position of point Q can be found from a simple geometrical calculation using parameters in FIG. 15.

The point P is required to be located in proximity to an apex T than the point Q. At this time, it is necessary to confirm that the outermost light ray 207 emitted from the DMD 3 reaches the reflection surface 122.

FIG. 16 is a diagram of output of a computer simulation (ray-tracing simulation) that is conducted by using a prism made up of two prism pieces designed in the design procedure as described. Even from such light rays' loci, the position of the point P, or the position of the reflection surface 122 can be easily determined by finding the angle κ.

Figure 17:
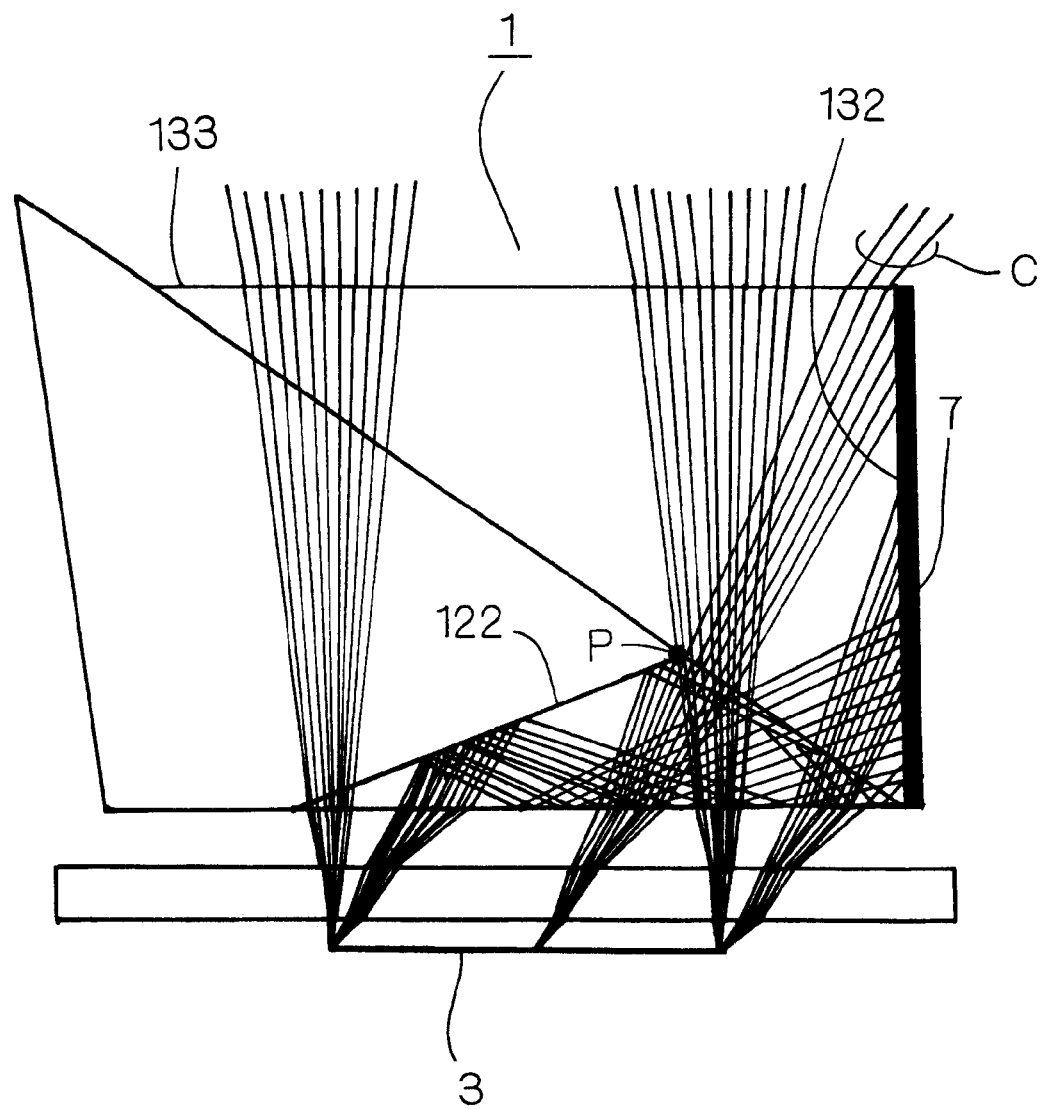
FIG. 17 is a diagram of a light ray tracing that illustrates operation of a prism consisting of three prism pieces.

FIG. 17 is a diagram of output obtained by ray-tracing of the state that OFF light travels though the prism 1 made up of three prism pieces designed in the above manner. With reference to FIG. 17, it will be noted that by the presence of the totally reflection surface 122, most of the unwanted light rays being able to enter the projection lens can be directed to the side surface 132 of the prism 1.

In FIG. 17 there are illustrated a small amount of light rays that reach directly a final exit surface 133 of the prism 1, however, such light rays can be eliminated by adjusting the position of point P.

Thus, while retaining the outer shape of the prism made up of two prism pieces, the OFF light that is the major cause of a contrast reduction can be treated reliably, in particular, without changing the plate thickness when the prism 1 as viewed from the projection lens is regarded as a plane parallel plate.

It is difficult to show the effect of contrast improvement by a concrete numerical value, because it depends on the specification of the entire projection optical system. However, several times or more improvement in contrast can be expected than the optical system using the prism comprised of two prism pieces as stated earlier in Conventional Technique V, because the OFF light treatment function can be centralized on the surface 132 and a shading member 7 disposed thereon. As a result, there is no possibility that OFF light is received by (allowed to enter) the projection lens.

Figure 18:
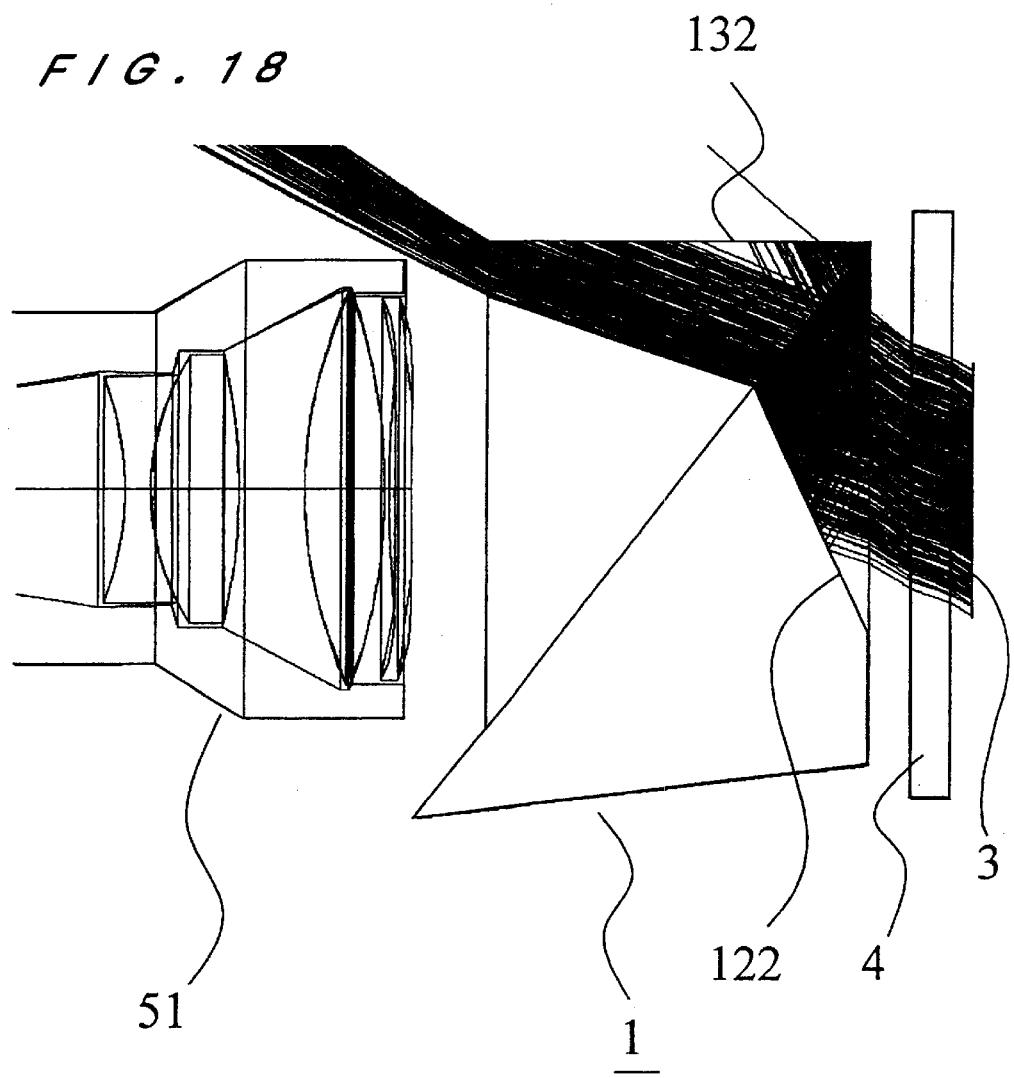
FIG. 18 is a diagram of output of a computer simulation in order to examine the unwanted light entering a projection lens in the above prism.

FIG. 18 illustrates part of the output of a computer simulation conducted for an optical system in which a projection lens similar to that in FIG. 11, is combined with a prism 1 made up of three prism pieces.

The output of this simulation shows that once light rays reflected by the DMD 3 reach the totally reflection surface 122, they can reach the side surface 132 without exiting from the prism 1. It is therefore able to practically eliminate the light rays travelling directly into the projection lens, in the OFF light not blocked by the shading member on the side surface 132.

Production of Prism 1

In producing a prism 1, the factors which can affect the performance of the prism 1 are accuracy of the shape and flatness of each prism piece, stability of material characteristics, and accuracy of formation of each air gap between prism pieces (i.e., accuracy of disposition of the prism pieces).

Accuracy of the shape and flatness of each prism piece is a basic specification of the present prism, and accuracy as a plane parallel plate disposed between the projection lens 51 and DMD 3, is an important factor related to the resolution of projected images.

It is preferable to improve, by anti-reflection coating, transmittance of the respective optical planes such as of prism pieces constituting the prism 1, the DMD surface, and lens surfaces constituting the projection lens. For instance, sand blasting finish is suitable for planes other than the optical planes, because of their great influence on an improvement in handling and on the stray light treatment.

The tolerance and dispersion values of refractive index of the prism material are important in satisfying the total reflection condition. As will be hereafter described, thermal expansion coefficient is also an important parameter in producing prisms.

With regard to the air gap which is provided for causing total reflection action, it is necessary to consider the fact that the light rays passing through without causing any total reflection action, are subjected to refraction at the air gap, and therefore, the size and accuracy of the air gap affect the optical system performance, in particular, the resolution of projected images.

Formation of Air Gap

In general, a method of interposing a spacer made of a material different from that of a prism piece, is often employed in the formation of air gaps (air clearances). In this method, variations in the length of an air gap due to thermal expansion of the prism material, is required to be constant irrespective of the location. Therefore, it is desirable that spacer material has the same thermal expansion coefficient as the prism material. For instance, when BK7 is used as the prism material, BK7 is also used as the spacer material.

Deterioration of resolution due to the air gap is first depend on the air gap size itself.

Figure 19:
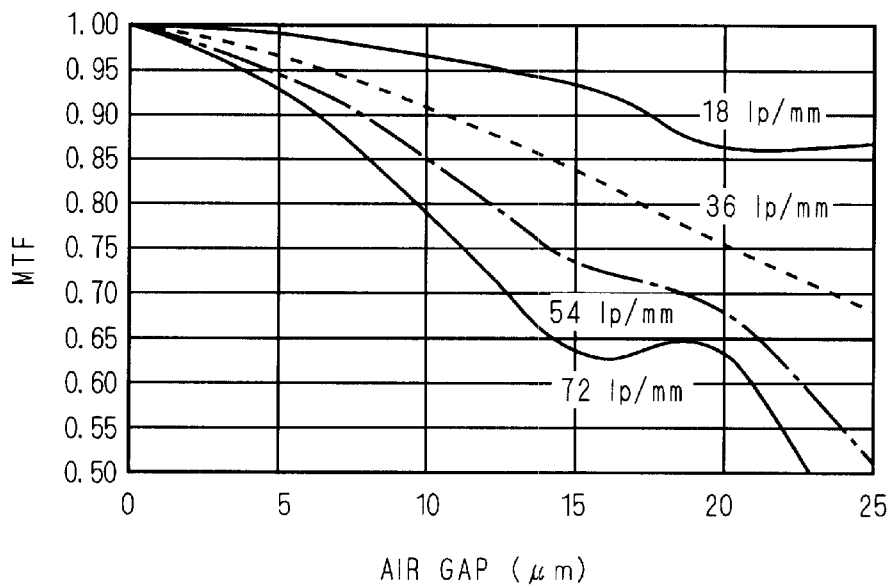
FIG. 19 is a graph showing the relationship between the size of an air gap of a prism piece and MTF.

FIG. 19 is a graph obtained by calculating the relationship between an air gap inclined at a predetermined angle to the optical axis 6 of the DMD 3 shown in FIG. 7, and MTF used for evaluation of resolution, on the assumption that light having an F-number of 3 enters the prism 100 made up of the two prism pieces 10 and 13 shown in FIG. 7.

A permissible MTF deterioration depends on the performance required of the system. If it is several percents, it is able to obtain a design condition that the air gap in the range of a spatial frequency shown in FIG. 19 (i.e., the range up to 72 lp/mm, where lp/mm=line pair/mm) should be not more than several microns.

In the ideal air gap, the surfaces that form the air gap are parallel to each other. If these are deflected (i.e., these are relatively inclined beyond the limit within which these can be regarded as being optically parallel), a stigmatism of the projection lens will occur, resulting in a noticeable degradation of image quality.

Figure 20:
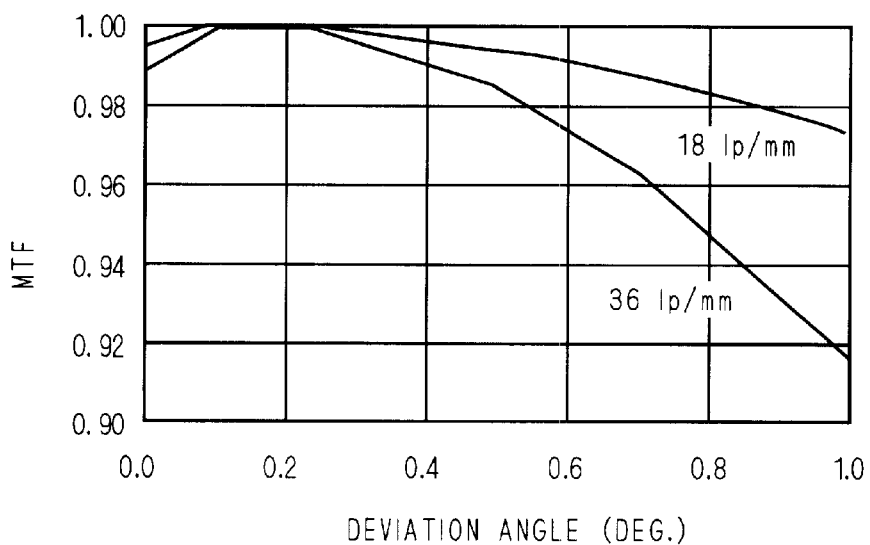
FIG. 20 is a graph showing the relationship between the inclination of a plane forming an air gap and MTF.

FIG. 20 is a graph of an example of the result obtained by calculating the influence exerted on MTF in the event that deflection takes place in an air gap, and two surfaces which should be parallel to each other are inclined, thereby the air gap has the shape of a wedge.

The above calculation is also made by assuming the optical system used in the calculation of FIG. 19. However, depending on the setting of the inclination of the air gap to the optical axis 6 of the DMD 3, an MTF to be obtained on the optical axis 6 of the DMD 3 is not always the best. Accordingly, it is uneasy to derive a permissible value of the angle of inclination of the air gap.

The above-mentioned calculation is however useful for the purpose of obtaining a rough estimation of a permissible angle of inclination, from the relationship between a desired resolution and spatial frequency.

Consider from the results of the calculations as described, there is a high possibility that a prism with excellent resolution property can be produced by setting the air gap to about 2 microns or 3 microns.

For instance, a suitable method of attaining such a micro air gap is one in which a coating such as of a dielectric multilayer film or a metal film is applied only to a predetermined micro area.

Figure 21:
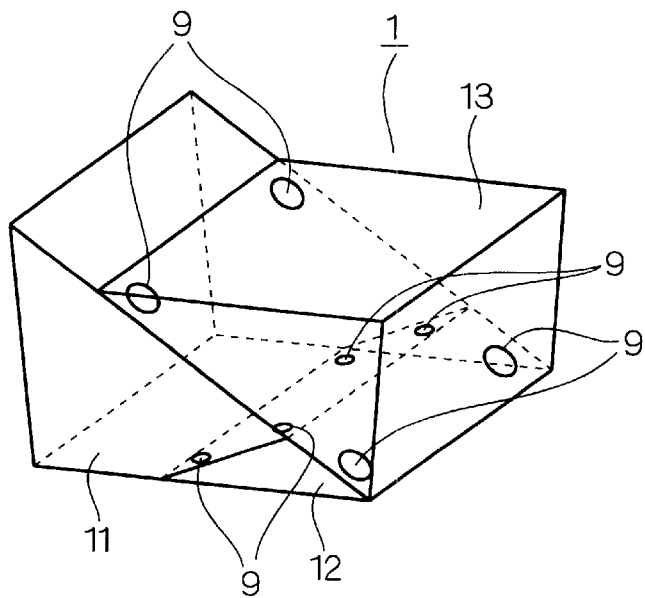
FIG. 21 is a schematic diagram illustrating a disposition of spacers that define the size of an air gap between prism pieces.

FIG. 21 is a perspective view illustrating the above method. In FIG. 21, reference numeral 9 denotes spacers disposed on the surfaces of prism pieces 11, 12 and 13, any one of which is opposed to the other two prism pieces. As shown in FIG. 21, the spacers 9 are disposed on the corners of these surfaces in order to keep away from effective regions through which light rays pass (i.e., in order not to intercept the light rays).

The spacers 9 can be formed by employing a coating of a multilayer film or metal film by means of evaporation, alternatively, sputtering. Thereby, it is able to reliably form an air gap in which the distance between the face-to-face surfaces and the occupied area of the spacer itself are both far smaller than that in the spacer previously described (i.e., the spacer obtained without using any coating of a multilayer film).

Alternatively, a micro projection made of a laminated structure obtained by coating, may be formed directly on each prism piece. This simplifies the work (step) of determining the relative positions of adjacent prism pieces, than the case of using the spacer previously described (i.e., the spacer obtained without using any coating of a multilayer film).

When a spacer is formed by means of coating of a multilayer film as described, there are the advantages that using an adhesive for fixing the spacer can be avoided, and that the spacer may not take a function to fix the adjacent prism pieces.

The air gap between prism pieces is insured by the above-mentioned spacers and coating of multilayer films, and, in this state, the relative positions of the prism pieces can be fixed with, for example, an adhesive which contains at least one selected from the group consisting of ultraviolet curable resin, thermosetting resin (including silicone rubber resin), and cyanogen containing resin.

The adhesive can be applied to any area other than the effective region through which light rays pass. For instance, in the area where the spacer is in contact with the surface of a prism piece, the adhesive may be applied to either the spacer or the surface of the prism piece, or applied to an area in the vicinity of ridgelines that form the face-to-face surfaces of the prism pieces.

Alternatively, unless any spacers are provided, an adhesive may substantially produce the effect of spacers.

Thus, the prism pieces are fixed to each other by the spacers (adhesive having substantially the effect of the spacers is included) which have approximately the same coefficient of thermal expansion as that of the prism piece, and the adhesive.

Fixing of Prism Pieces

One practically effective method of fixing prism pieces is one utilizing planes other than optical action planes of the prism which act as a surface through which light rays partaking of projection pass, until illuminating light enters a projection lens.

Figure 22:
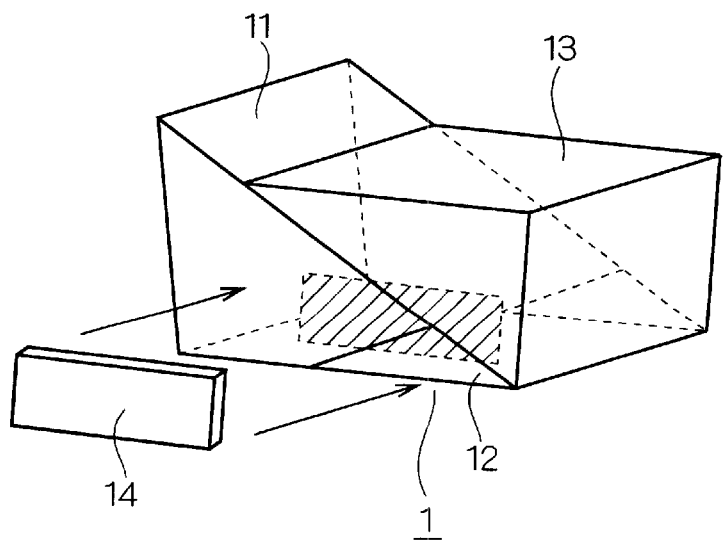
FIG. 22 is a schematic diagram illustrating a disposition of fixing members with which prisms are mutually fixed.

FIG. 22 is a schematic diagram illustrating a method of fixing a prism 1 made up of three prism pieces, by using a plate material made of the same material of the prism 1.

In FIG. 22, reference numeral 14 denotes a plate-like fixing member with which prism pieces 11, 12 and 13 are mutually fixed.

In this case, the fixing member 14 can be fixed by applying an adhesive to a portion corresponding to part of the respective prism pieces 11 to 13, in a region of such size and shape as to allow for contact with every prism piece (i.e., the region indicated by slanting lines in FIG. 22).

For this fixing, one having a suitable property may be selected from a variety of adhesives. It is however necessary to avoid the use of one causing a noticeable degradation of adhesive strength or deformation of the prism material, due to photo-absorption or temperature change.

When an adhesive is applied to a plurality of micro regions in the contact surface between the fixing member 14 and the side surface of the prism, but not to the entire contact surface, the location of the adhesive should be selected in order that such a large stress as to cause deformation of air gaps will not exert on each prism piece by photo-absorption or temperature change, or deformation of the adhesive due to change with age.

Figure 23:
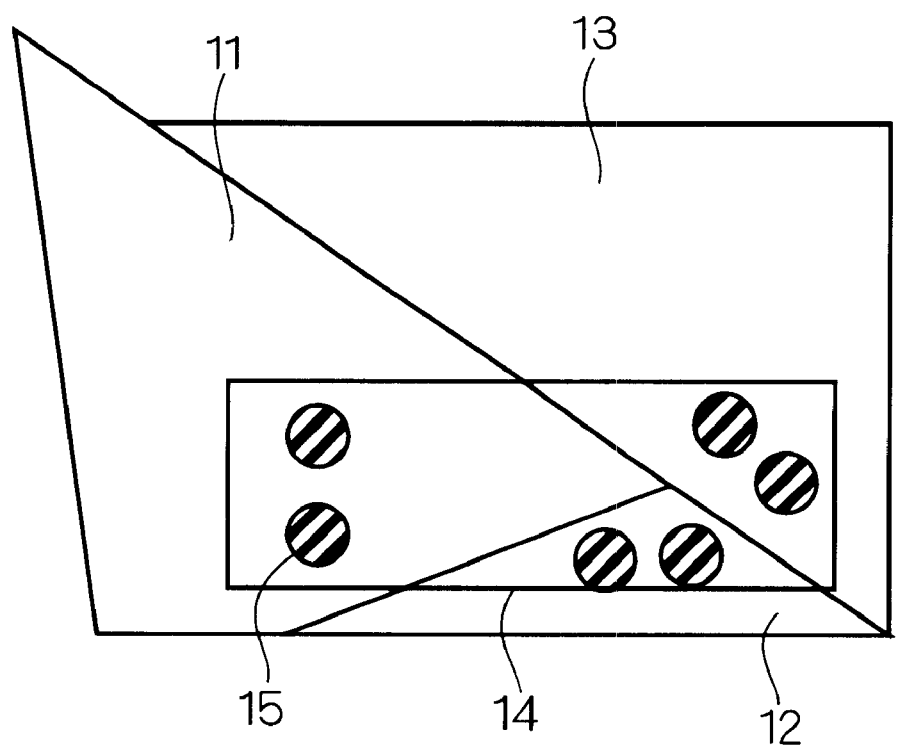
FIG. 23 is a schematic diagram illustrating a disposition of adhesive applied to the fixing members.

FIG. 23 illustrates the location of adhesive to fix a fixing member 14 and a prism piece 11, 12 or 13.

In FIG. 23, regions 15 indicated by slanting lines denote a location to which an adhesive is applied. As illustrated in FIG. 23, the adhesive is applied to a plurality of locations on the prism pieces 11, 12 and 13, respectively.

Thus, by applying the adhesive to a plurality of locations per prism piece, it is able to obtain the effect of dispersing stresses induced by deformation of the adhesive.

It is of course desirable that the coefficient of thermal expansion of the adhesive is approximate to that of the prism material and that of the material of the fixing member 14.

Shading Member

Description will now be given of a shading member 7 (see FIG. 1 or 17), which is disposed on the side surface 132 of the prism piece 13, as a key factor related to improvement in contrast.

The shading member 7 may be a photo-absorbing material made of a black coating applied on the side surface 132. However, if there is the possibility of adverse effects on the prism 1 (e.g., distortion of shape due to temperature rise), which can be caused with heat generated by photo-absorption, another shading member made of a material other than the black coating may be used.

When the black coating is applied directly on the side surface 132, so as to be tightly with the side surface 132, the optical reflection action on the side surface 132 may be reduced while enhancing photo-absorption action, by treating the side surface 132 to obtain a rough surface (e.g., by means of sand blasting finish).

Alternatively, when photo-absorption is performed by another member, it is preferable, in some cases, to form the side surface 132 into a faceted or multi-face configuration, rather than a planar configuration, in order that the light rays arrived at the side surface 132 exit from the prism 1, without causing any reflection. In this case, a photo-absorption layer can be disposed on the exterior spaced apart from the prism 1 (i.e., the exterior spaced apart from the side surface 132 of the prism piece 13). With this arrangement, it is able to minimize that the heat generated by photo-absorption is conducted to the prism 1, thereby suppressing a temperature rise in the prism 1.

Figure 24:
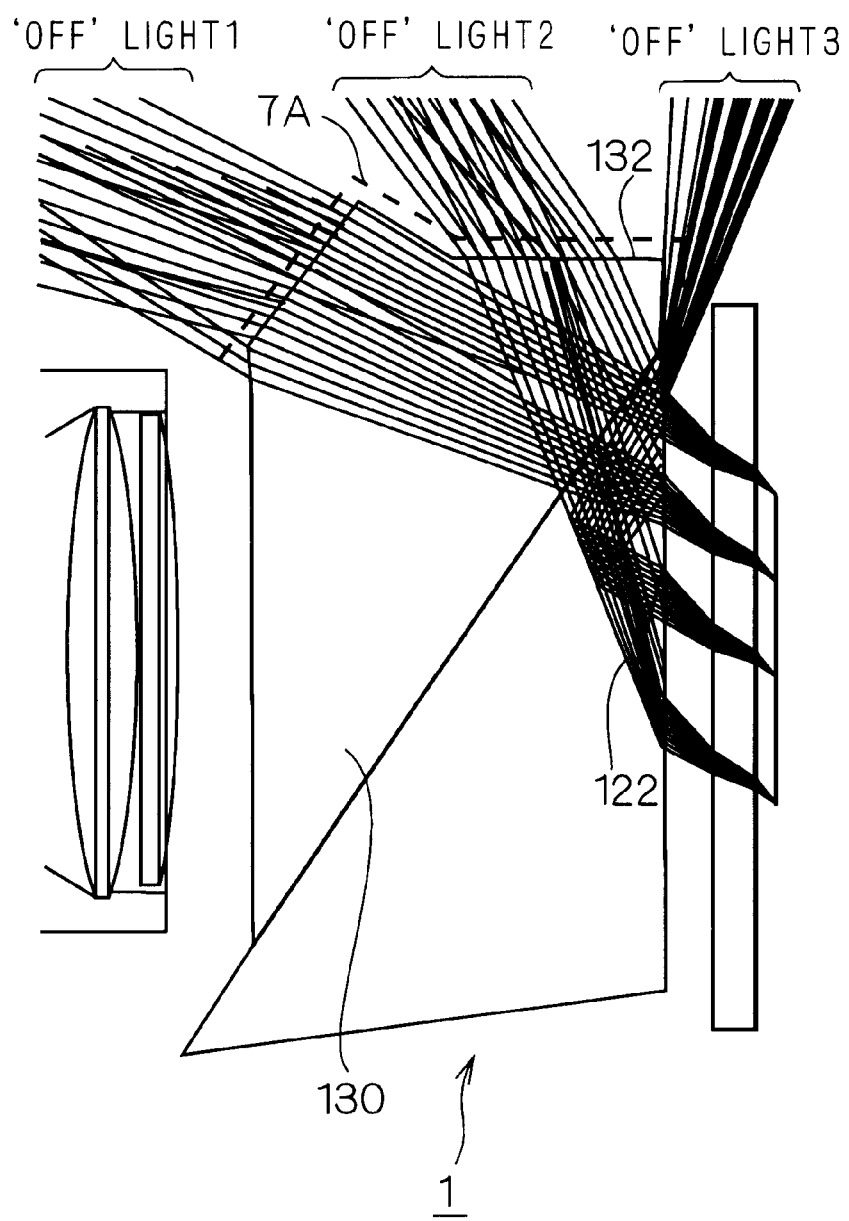
FIG. 24 is a schematic diagram illustrating the shape of a side surface by which the unwanted light arriving at a side surface of a prism is guided to the exterior of the prism.

FIG. 24 illustrates the result of a simulation conducted about a shape of the side surface 132 from which the light rays arrived at the side surface 132 is emitted to the exterior of the prism 1 efficiently.

The OFF light incident on a prism piece 130 can be divided into two categories: the light rays indicated by "OFF light 1"; and those indicated by "OFF light 2", as shown in FIG. 24. The "OFF light 1" passes through the surface 123 (see FIG. 1), without entering the totally reflection surface 122.

With reference to FIG. 24, it is understood that a side surface 132 of the prism piece 130 is shaped so as to correspond to the "OFF light 1" and the "OFF light 2," and thus succeeded in guiding the OFF light to the exterior of the prism 1 reliably.

Alternatively, by disposing a shading member (photo-absorbing material 7A), for example, at the location indicated by dotted line in FIG. 24, the OFF light treatment (absorption) can be conducted without causing any temperature rise in the prism piece 130 itself (prism 1 itself).

Holding of Prism

Figure 25:
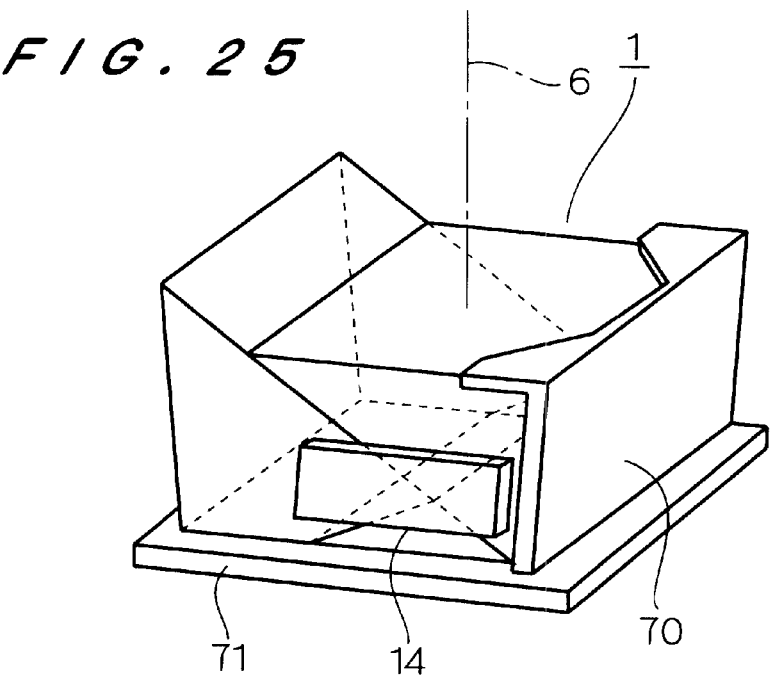
FIG. 25 is a schematic diagram illustrating the shape and disposition of a photo-absorbing member.

In the case that a shading member (photo-absorbing material) is disposed separately from a prism 1 (or the prism piece 13 in the case of the foregoing description), by applying the photo-absorbing material to an inner surface of a holding member 70 for holding the prism 1 shown in FIG. 25 (particularly, to an inner side surface opposed to the side surface of the prism piece 130), two functions of holding the prism 1 and of absorbing OFF light can be attained at the same time, thereby reducing the number of components.

Referring to FIG. 25, the holding member 70 for holding the prism 1 is attached to a base 71 of the prism 1, and a photo-absorbing material (e.g., black coating) is applied to a surface of the holding member 70 which the OFF light exiting from the prism 1 enters.

In order that ON light is not intercepted by the holding member 70, it is desirable that the holding member 70 has such a shape as to hold the prism 1 at the corners of the prism 1 and also secure their locations, as shown in FIG. 25.

This way of holding enables to suppress movement of the prism 1 in the direction of contact with the base 71, and to also suppress its movement in the direction along the projection optical axis 6.

Figure 26:
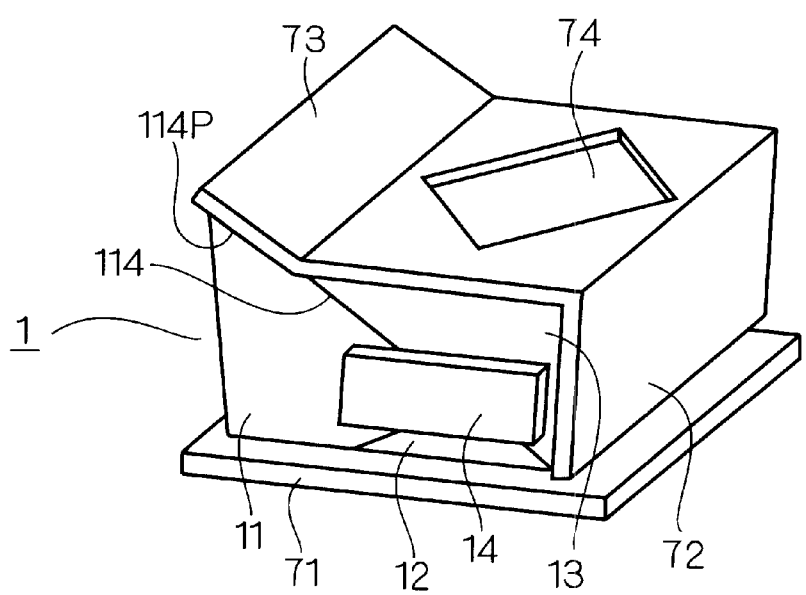
FIG. 26 is a schematic diagram illustrating the shape and disposition of a photo-absorbing member having an opening.

FIG. 26 illustrates, as another shape, a prism holding member 72, which has an opening 74 through which light can exit (i.e., a light exit opening 74).

The holding member 72 covers, except for the light exit opening 74, the upper surface of the prism 1 (the plane including the region where the light emitted to a projection lens passes through). In addition, the holding member 72 has a lid-like part 73 to fit an inclined part 114P of the prism piece 11 (which is part of the outer shape of the prism 1), the part 73 covering the part 114P. Note that the holding member 72 is so disposed that an air gap is interposed between the prism piece 11 and holding member 72, namely, that an opposite surface of the holding member 72 (which corresponds to a rear surface of the inclined part 73) is not in contact with the surface of the prism piece 11.

With this arrangement, shading and dustproof of the surface of the prism piece 11 can be attained. This enables to minimize that OFF light and stray light caused by the entry of OFF light are transferred to the projection lens. This also prevents a drop in the efficiency of total reflection action on the surface 114 of the prism piece 11, due to contamination of the inclined part 114P that is exposed as the outer shape of the prism 1.

In order to configure a prism that is less susceptible to an optical performance change against the outer environmental change, namely, a prism tough against environmental change, it is desirable that the space generated by the air gaps is sealed with a sealing compound or the like. This enables to minimize blooming of an optical surface due to bedewing and deterioration due to chemical change in a glass polishing surface.

It should be noted that each of the first, second and third prism pieces 11, 12 and 13 may be configured as a single prism piece made up of a plurality of prism pieces. Alternatively, the surface 114B of the first prism piece 11 (see FIG. 1) may be used as an outer surface parallel to the surface 112.

As described above, with regard to the prism made up of three prism pieces, there have been discussed from the basic configuration as shown in FIG. 1, to the various modifications. It is of course possible that, without limiting to these embodiments, numerous modifications and variations can be devised without departing from the object, use and gist of the present invention.

Second Preferred Embodiment

Optical System of Projector

Figure 27:
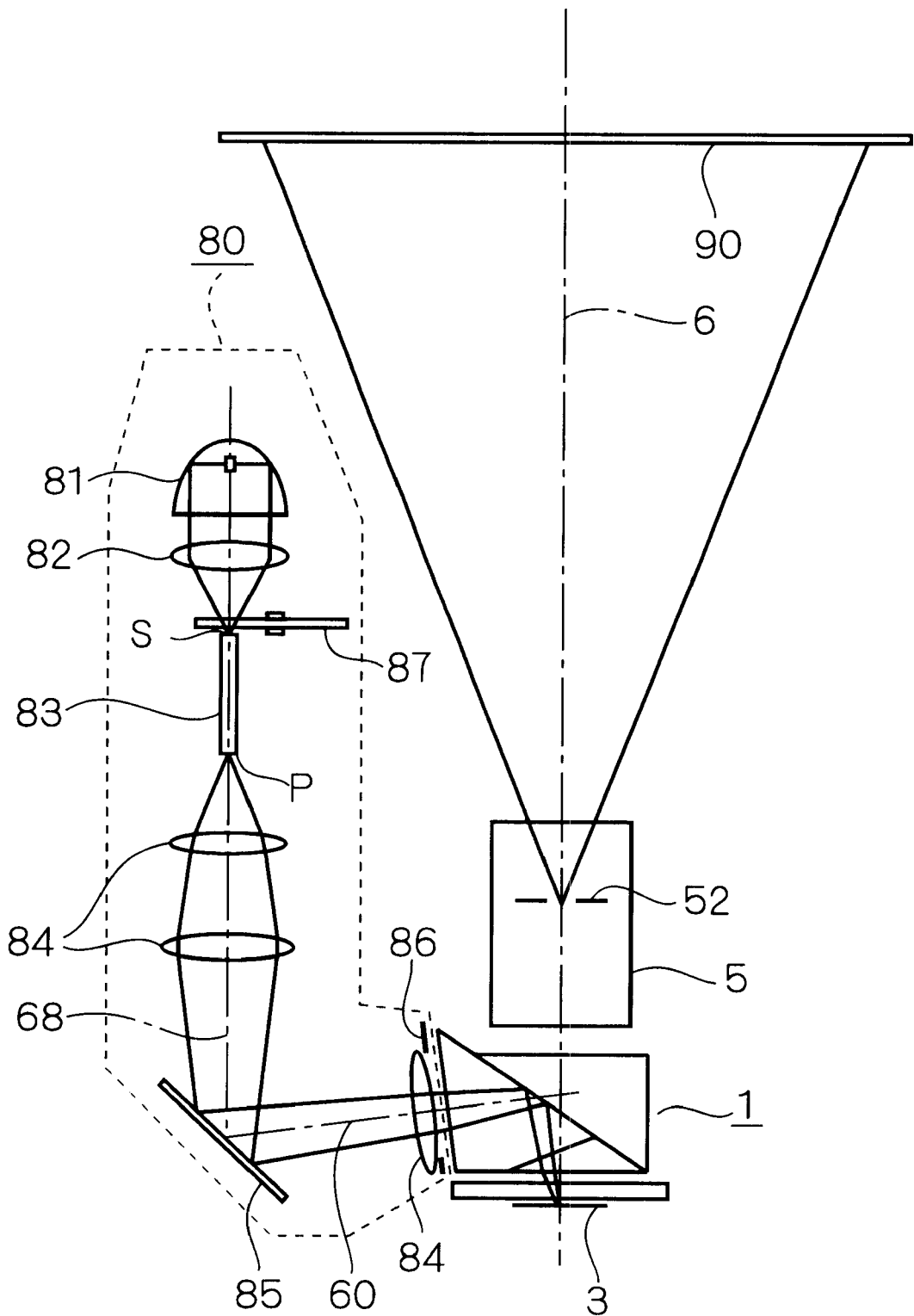
FIG. 27 is a schematic diagram of a projector optical system according to a second preferred embodiment.
Figure 28:
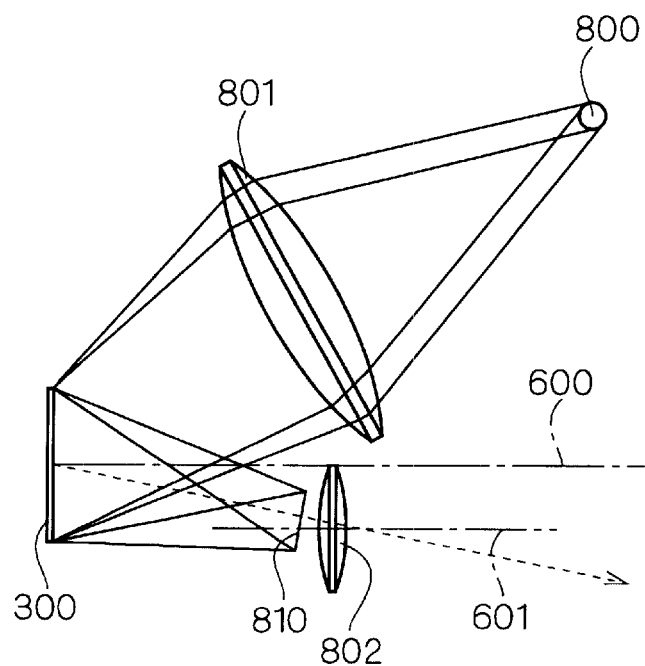
Figure 29:
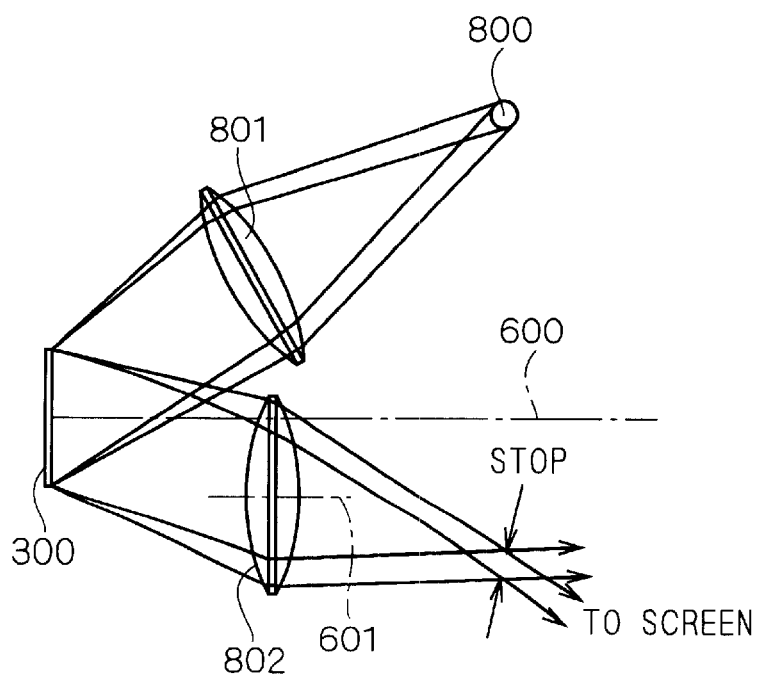
Figure 32:
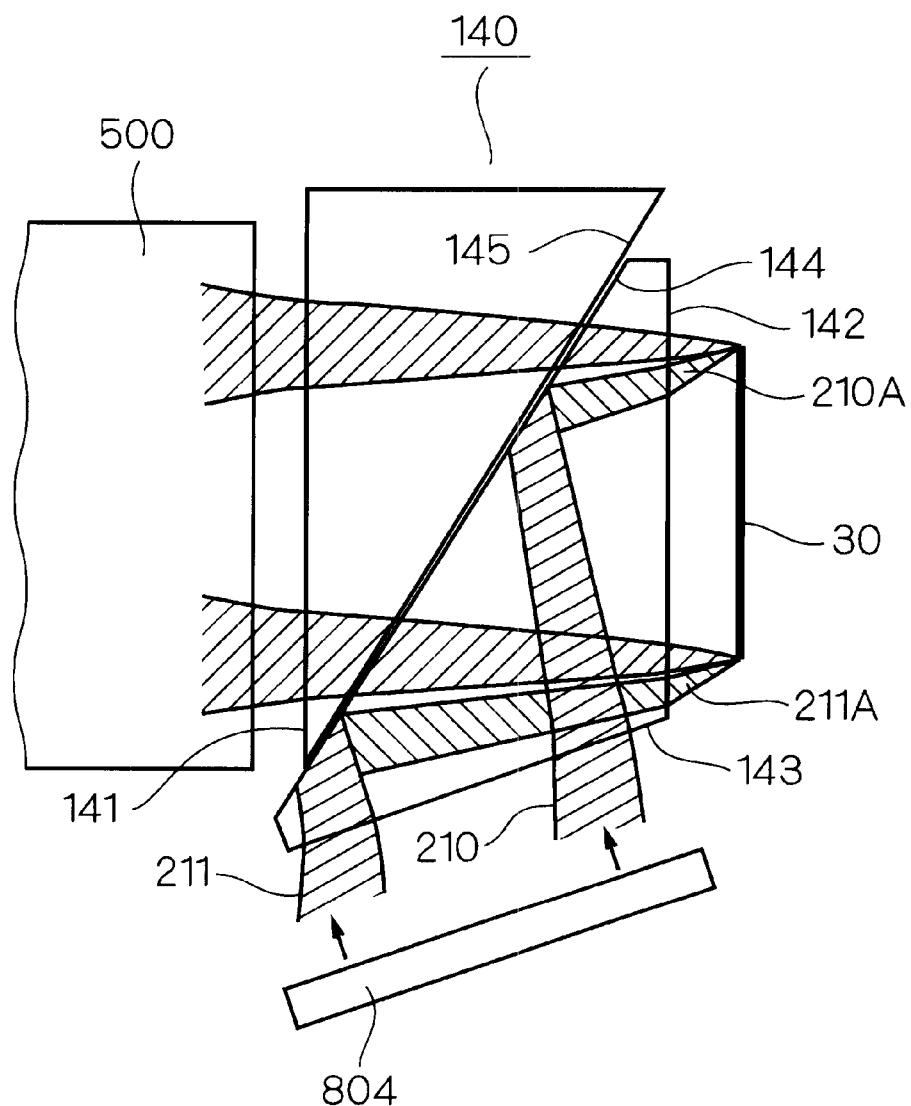
FIG. 32 is a schematic diagram of a conventional illuminating optical system made up of two prism pieces.
Figure 33:
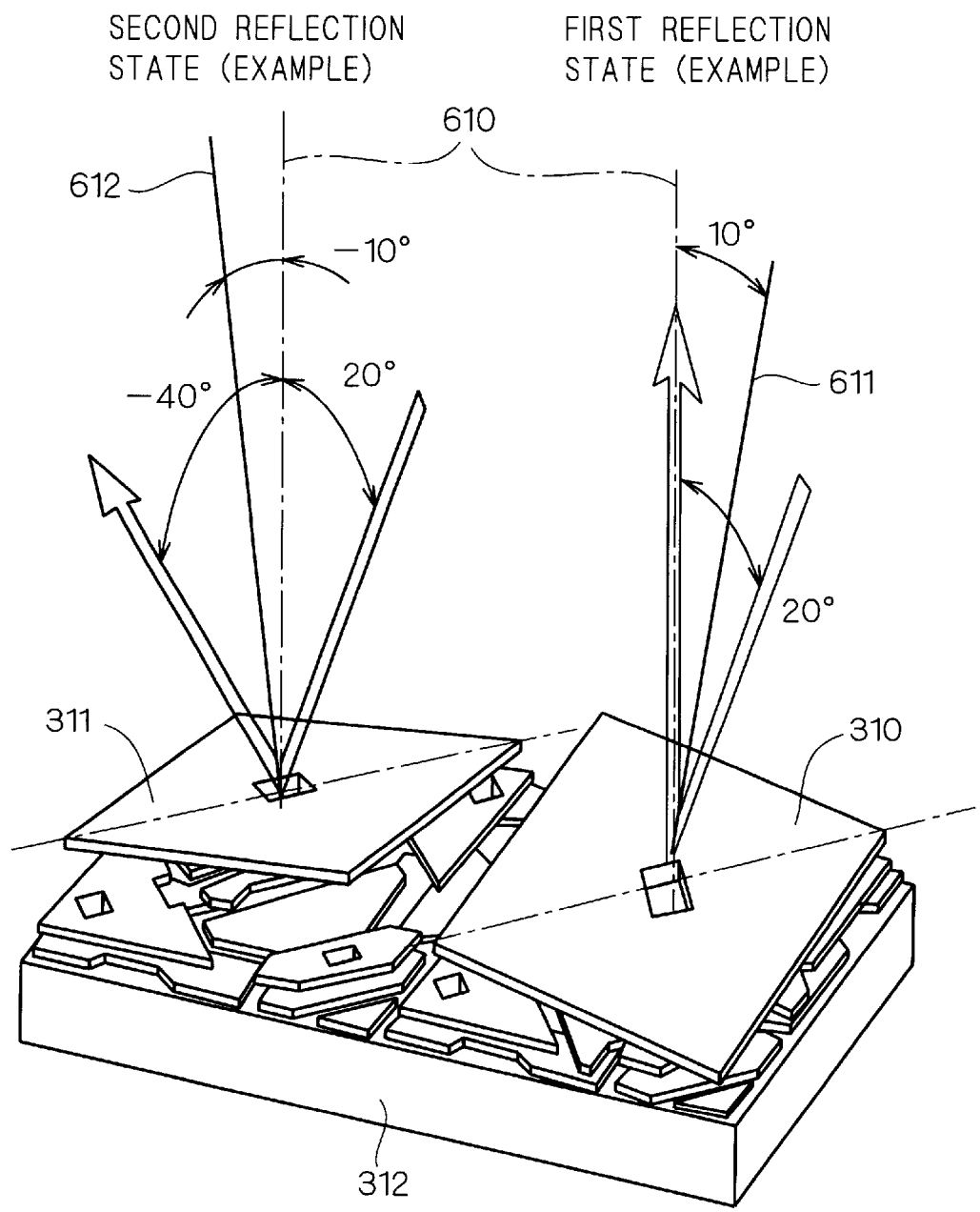
FIG. 33 is a schematic diagram illustrating operation of a DMD having two mirrors.
Figure 34:
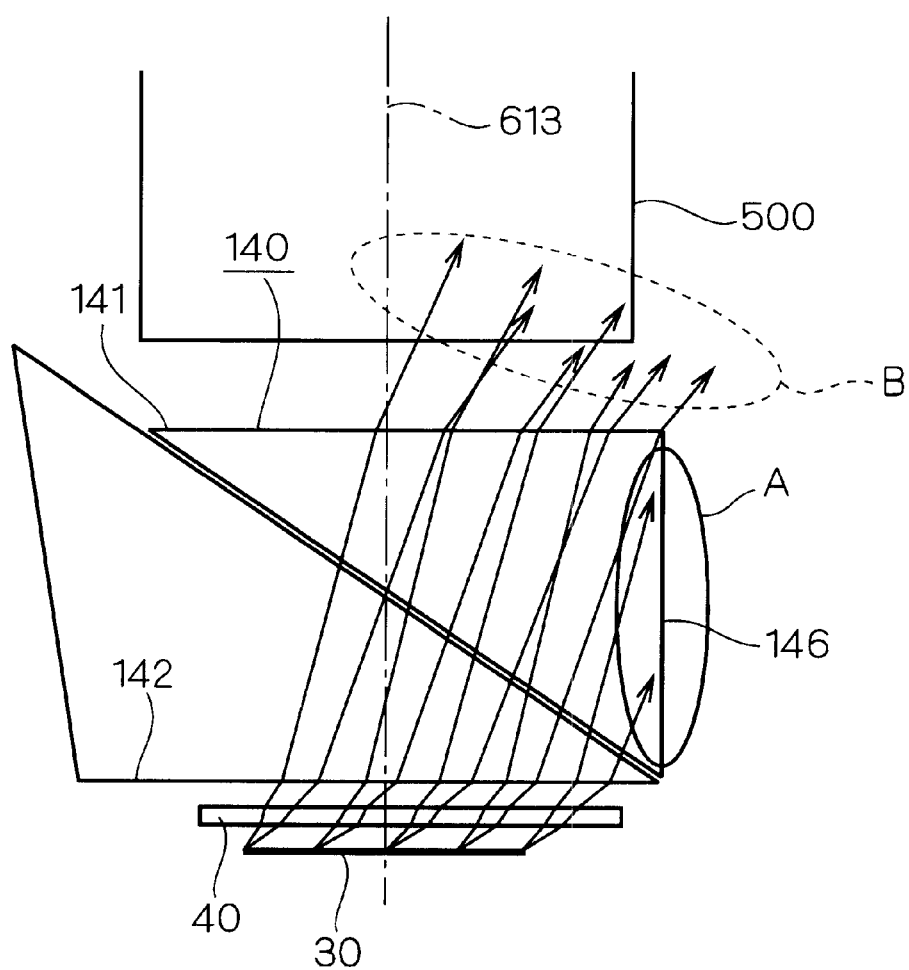
FIG. 34 is a schematic diagram illustrating drawbacks to be solved in a conventional illuminating optical system comprised of two prism pieces.
Figure 35:
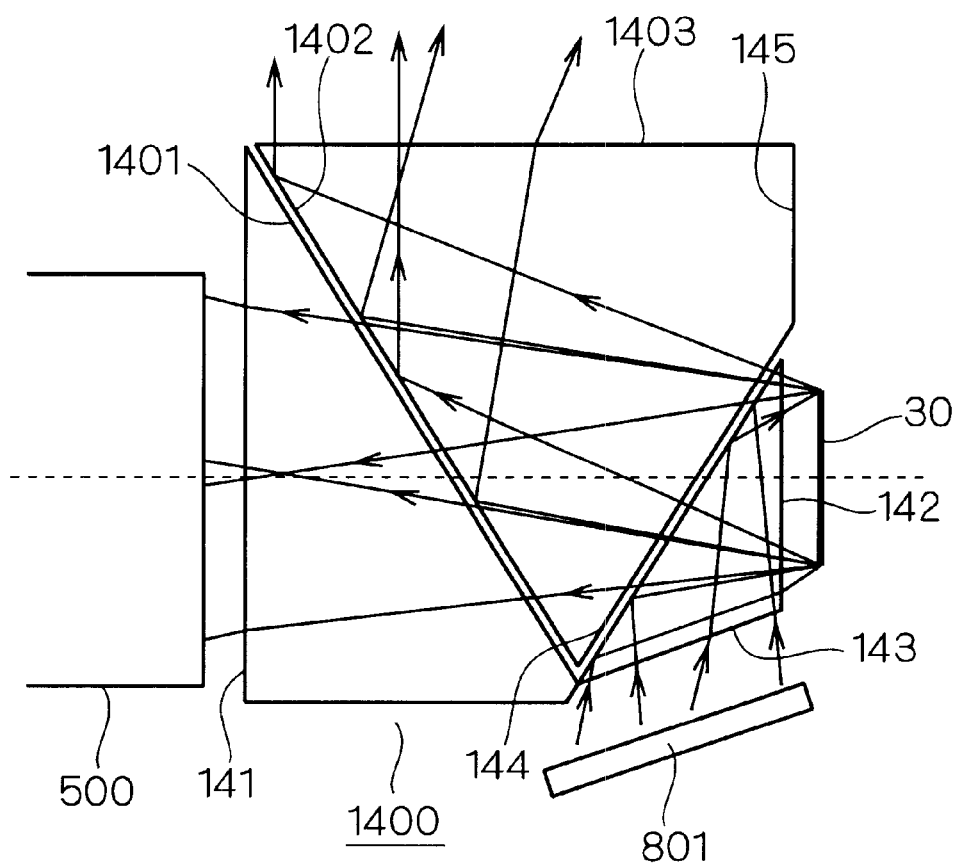
FIG. 35 is schematic diagram of a conventional illuminating optical system comprised of three prism pieces.

FIG. 27 is a diagram illustrating an optical system of a projector according to a second preferred embodiment. In FIG. 27, reference numeral 1 denotes the prism and numeral 5 denotes the projection lens, as described in the first preferred embodiment. Numeral 80 denotes an illuminating optical system that provides illuminating light to an entrance surface of the prism 1.

Assuming that the DMD 3 described in the first preferred embodiment is used as a variable mirror element serving as a light valve, the following description will be given of a single-plate type projector that performs an enlarged display by the DMD 3 alone.

The optical system of the projector comprises mainly four elements of the prism 1, projection lens 5, DMD 3, and illuminating optical system 80. The light emitted from the projection lens 5 is projected in an enlarged scale on a screen 90, to supply a large-size video image to viewers.

In FIG. 27, reference numeral 81 denotes a light source lamp, numeral 82 denotes a condenser lens for condensing a bundle of rays emitted from the light source lamp 81, and numeral 83 denotes a rod element by which intensity distribution of the convergent bundle of rays emitted from the condenser lens 82 is made uniform. Numeral 84 denotes an image formation lens system in which the bundle of rays emitted from the rod element 83 is imaged on the DMD 3 at a predetermined magnification, and the image formation lens system 84 is usually made up of a plurality of lenses.

Reference numeral 68 denotes an optical axis of the light source lamp 81. Numeral 85 denotes a reflecting mirror that bends the optical axis 68 to provide an illuminating optical axis 60 of the DMD 3, and the reflecting mirror 85 can be disposed at any location as required.

Reference numeral 86 denotes a virtual opening (hereinafter referred to as "light emission opening"), assuming the final exit surface of the illuminating optical system 80. Numeral 87 denotes a rotary color filter, and it has a region of an optical color filter containing at least primaries of red (R), green (G) and blue (B). The rotary color filter 87 is an optical element to produce colors in a field sequential fashion, by rotating in response to a single-plate light valve system, e.g., in synchronization with a synchronous signal of a video signal.

Thus, the illuminating optical system 80 comprises several optical elements to function as an optical system for illuminating the DMD 3 efficiently. When the illuminating optical system 80 is viewed from the prism 1, the light exit opening 86 disposed directly ahead of the prism 1, corresponds to the illuminating light source 8 shown in FIG. 1.

As stated earlier in the first preferred embodiment, a telecentric illumination is suitable for illuminating the DMD 3 via the prism 1.

The image formation lens system 84 used in this projector is one in which a light emitting plane being formed on an exit end face P of the rod element 83 and having a substantially uniform light intensity distribution, is arranged to be in a conjugate relationship with the DMD 3. By configuring (designing) the image formation lens system 84 as a telecentric lens system, it is able to increase transmissibility before and after light enters or exits from the DMD 3.

In designing this lens system, the prism 1 can be formed as a wedge-like optical element as described with reference to FIG. 3. For simplicity, however, it can be designed as a plane parallel plate.

When the prism 1 is designed as a wedge-like one, attention should be given to variations in the F-number of illuminating light, because after light exits from the prism 1, the wedge-like angular aperture appears as deviation in angle of the light ray travelling to the DMD 3.

Actually, the incident angle of the marginal rays entering the DMD 3 is increased. Therefore, depending on the design of the prism 1, an image formation lens system which has an F-number greater than an F-number required of the specification of the DMD 3 (F-number of 3 in the foregoing description) is suitable in some cases.

The light emitting plane having uniform intensity distribution, which is formed on the exit end face P of the rod element 83, is obtained by combining the light source lamp 81, condenser lens 82 and rod element 83.

For example, there are a system in which the light source lamp 81 is configured by a lamp system consisting of a parabolic mirror and a discharge lamp, and a substantially parallel rays emitted from the light source lamp 81 are converged by the condenser lens 82 and then guided efficiently to an entrance surface S of the rod element 83.

Such an optical system for a projector that increases uniformity of illuminating light by using the rod element 83, is described in detail in, e.g., U.S. Pat. No. 5,634,704.

The configuration of the illuminating optical system 80 is not to be limited to one illustrated in FIG. 27. Applicable to the present projector is any illuminating optical system which has a high compatibility with the prism 1, which can illuminate the DMD 3 efficiently and which can emit illuminating light that can provide a predetermined brightness and contrast when the illuminating optical system 80 is subjected to an enlarged-size projection by the projection lens 5.

For instance, a fly eye integrator system is usually employed to increase uniformity of illuminating light ray distribution. This can also be adopted for the present preferred embodiment without any problems.

In order to allow the projector to produce colors, a rotary color filter 87 is not necessarily required. In place of the rotary color filter 87, any coloring part which has a high compatibility with the illuminating optical system 80 and is capable of providing a high-efficiency projector, can be provided at a suitable part in the illuminating optical system, without any problems.

While the invention has been shown and described in detail, the foregoing description is in all aspects illustrative and not restrictive. It is therefore understood that numerous modifications and variations can be devised without departing from the scope of the invention.

What is claimed is:

1. A prism disposed between an external variable mirror element and an external projection lens having a projection optical axis parallel to a normal of said variable mirror element, said prism comprising:

a first inner surface comprising a first end spaced a first distance apart from said variable mirror element and a second end, said first inner surface being inclined from said first end to said second end in a direction away from said variable mirror element, said first inner surface being configured to totally reflect a bundle of externally entered rays and to propagate said bundle of externally entered rays thus reflected toward said variable mirror element; and a second inner surface comprising first and second ends spaced second and third distances apart from said variable mirror element, respectively, said second inner surface being configured (i) to transmit said bundle of externally entered rays totally reflected from said first inner surface to propagate said bundle of externally entered rays to said variable mirror element, (ii) to transmit a first bundle of rays in a first reflection state among bundles of rays reflected from said variable mirror element, and (iii) to totally reflect said first bundle of rays in a second reflection state among said bundles of rays reflected from said variable mirror element, said second reflection state being different from said first reflection state, said first distance being greater than said third distance, said third distance being greater than said second distance, and wherein, when said first bundle of rays in said first reflection state transmitted through said second inner surface enters said first inner surface, said first inner surface transmits said first bundle of rays in said first reflection state to propagate said first bundle of rays in said first reflection state toward said projection lens.

2. The prism according to claim 1 further comprising a third inner surface that is flush with said first inner surface, and comprises first and second ends spaced a fourth distance and said third distance apart from said variable mirror element, respectively, said third inner surface being configured to allow a second bundle of rays in said first reflection state incident thereon without entering said second inner surface, to pass therethrough and propagate toward said projection lens, and to allow said second bundle of rays in said second reflection state incident thereon without entering said second inner surface, to pass therethrough, said second end of said second inner surface corresponding to said second end of said third inner surface.

3. The prism according to claim 2 further comprising:

a first outer surface that is disposed at a location opposed to said first inner surface and is an entrance surface which allows said bundle of externally entered rays incident thereon to pass therethrough and propagate through said prism toward said first inner surface;

a second outer surface that is disposed at a location opposed to said variable mirror element, said second inner surface and said third inner surface, and comprises a first end corresponding to said first end of said second inner surface and a second end corresponding to said first end of said third inner surface, said second outer surface serving as an optical action surface which allows said bundle of externally entered rays entering after having passed through said second inner surface, to pass therethrough and travel toward said variable mirror element, and which allows said bundles of rays reflected from said variable mirror element, to enter said prism; and a third outer surface that is substantially parallel to said second outer surface, disposed at a location opposed to said projection lens, and comprises a first end disposed above said first end of said third inner surface and a second end adjacent to said second end of said first inner surface, said third outer surface serving as an exit surface that allows transmission of both said first bundle of rays in said first reflection state incident thereon after having passed through said first inner surface, and said second bundle of rays in said first reflection state incident thereon after having passed through said third inner surface, said second, third and first inner surfaces being disposed between said second and third outer surfaces.

4. The prism according to claim 3 further comprising:

a fourth outer surface that is disposed at a location opposed to said first outer surface, said first inner surface and said third inner surface, said fourth outer surface comprising a first end connected to said first end of said third outer surface and a second end disposed adjacent to and above said second end of said second outer surface; and a shading member that is disposed on said fourth outer surface and absorbs said second bundle of rays in said second reflection state incident thereon after having passed through said third inner surface.

5. The prism according to claim 4 further comprising a fifth outer surface that is flushed with said second outer surface, and comprises a first end adjacent to said first end of said second outer surface and a second end connected to said first outer surface.

6. The prism according to claim 5 further comprising:

a first prism piece comprising said first outer surface, said fifth outer surface and said first inner surface;

a second prism piece comprising said second outer surface, said second inner surface and said third inner surface; and a third prism piece comprising said third outer surface and said fourth outer surface, wherein any one of said first, second and third prism pieces is opposed to the other two prism pieces via at least one air gap, a surface bounded by said third and fourth outer surfaces among outer surfaces which said third prism piece has is opposed to said first inner surface of said first prism piece and to said third inner surface of said second prism piece, and a surface bounded by said first inner surface and said fifth outer surface among outer surfaces which said first prism has is opposed to said second inner surface of said second prism piece.

7. The prism according to claim 6 wherein two opposed prism pieces among said first, second and third prism pieces are fixed by a spacer and an adhesive, each having a coefficient of thermal expansion approximately the same as that of said two opposed prism pieces.

8. The prism according to claim 6 wherein two opposed prism pieces among said first, second and third prism pieces are located opposed to each other, via thin film coatings provided on areas other than a light passage region, on either of opposed surfaces of said two opposed prism pieces.

9. A prism disposed between an external variable mirror element and an external projection lens comprising a projection optical axis parallel to a normal of said variable mirror element, said prism comprising first, second and third prism pieces, said prism being capable of selectively deflecting a bundle of first reflection state rays and a bundle of second reflection state rays that correspond to a first reflection state and a second reflection state, respectively, which are generated by said variable mirror element and are different with each other, (a) said first prism piece comprising:

a first surface allowing transmission of a bundle of externally entered rays;

a second surface performing total reflection of said bundle of externally entered rays after having passed through said first surface, and allowing transmission of said bundle of first reflection state rays incident thereon after having passed through said first prism piece; and a third surface allowing transmission of said bundle of externally entered rays incident thereon after having been totally reflected and propagated through said first prism piece, and allowing said bundle of first reflection state rays incident thereon to propagate through said first prism piece, (b) said second prism piece comprising:

a fourth surface being opposed to said third surface and allowing said bundle of externally entered rays incident thereon after having passed through said third surface, to pass therethrough and propagate through said second prism piece, and allowing said bundle of first reflection state rays incident thereon after having propagated through said second prism piece to pass therethrough toward said third surface, said fourth surface performing total reflection of said bundle of second reflection state rays incident thereon after having propagated through said second prism piece;

a fifth surface being opposed to said variable mirror element and allowing said bundle of externally entered rays incident thereon after having propagated through said second prism piece, to pass therethrough and propagate toward said variable mirror element, and allowing both said bundle of first reflection state rays and said bundle of second reflection state rays incident thereon, each having been generated when said bundle of externally entered rays is irradiated to said variable mirror element, to pass therethrough and propagate through said second prism piece, said fifth surface being capable of reflecting at least said bundle of second reflection state rays incident thereon after having been totally reflected on said fourth surface and then propagated through said second prism piece; and a sixth surface allowing (i) transmission of both said bundle of first reflection state rays and said bundle of second reflection state rays incident thereon after having passed through said fifth surface and then propagated through said second prism piece without reaching said fourth surface, and (ii) transmission of said bundle of second reflection state rays incident thereon after having been reflected at least on said fifth surface and then propagated through said second prism piece, said sixth surface being capable of performing again total reflection of said bundle of second reflection state rays incident thereon after having been totally reflected on said fourth surface and then propagated through said second prism piece, and (c) said third prism piece comprising:

a seventh surface being opposed to said second and sixth surfaces, allowing transmission of said bundle of first reflection state rays incident thereon after having exited from said first prism piece, and allowing transmission of both said bundle of first reflection state rays and said bundle of second reflection state rays which are incident thereon after having exited from said second prism piece; and an eighth surface being opposed to said projection lens, and allowing said bundle of first reflection state rays incident thereon after having passed through said seventh surface and then propagated through said third prism piece, to pass therethrough and propagate toward said projection lens.

10. The prism according to claim 9 wherein, said second surface is parallel to said seventh surface, said third surface is parallel to said fourth surface, said sixth surface is parallel to said seventh surface, and an air gap is provided between parallel surfaces.

11. The prism according to claim 9 wherein said second surface is flush with said sixth surface.

12. The prism according to claim 9 wherein, when α is an angle formed between said first and second surfaces, β is an angle formed between said fifth and sixth surfaces, and κ is an angle formed between said fourth and fifth surfaces, said angle α is larger than 38.0° and smaller than 50.4°, said angle β is larger than 25.0° and smaller than 37.4°, and said angle κ is larger than 16.2°.

13. The prism according to claim 9 wherein said third prism piece further comprises:

a side surface bounded by said seventh and eighth surfaces; and a shading member that is disposed on said side surface and intercepts said bundle of second reflection state rays incident on said side surface after having passed through said seventh surface and then propagated through said third prism piece.

14. A projection optical system comprising:

a light source;

a condensing optical system condensing rays from said light source;

a light intensity uniforming element comprising an entrance surface from which light condensed by said condensing optical system enters, and an exit surface from which a bundle of rays having a substantially uniform light intensity distribution exits;

a transfer optical system transferring said bundle of rays exiting from said exit surface of said light intensity uniforming element to a prism wherein said bundle of rays transferred by said transfer optical system enters said prism as a bundle of externally entered rays;

a variable mirror element; and a projection lens;

wherein said prism is disposed between said variable mirror element and said projection lens comprising a projection optical axis parallel to a normal of said variable mirror element, said prism comprising first, second and third prism pieces, said prism being capable of selectively deflecting a bundle of first reflection state rays and a bundle of second reflection state rays that correspond to a first reflection state and a second reflection state, respectively, which are generated by said variable mirror element and are different with each other, (a) said first prism piece comprising:

a first surface allowing transmission of said bundle of externally entered rays;

a second surface performing total reflection of said bundle of externally entered rays after having passed through said first surface, and allowing transmission of said bundle of first reflection state rays incident thereon after having passed through said first prism piece; and a third surface allowing transmission of said bundle of externally entered rays incident thereon after having been totally reflected and propagated through said first prism piece, and allowing said bundle of first reflection state rays incident thereon to propagate through said first prism piece, (b) said second prism piece comprising:

a fourth surface being opposed to said third surface and allowing said bundle of externally entered rays incident thereon after having passed through said third surface, to pass therethrough and propagate through said second prism piece, and allowing said bundle of first reflection state rays incident thereon after having propagated through said second prism piece to pass therethrough toward said third surface, said fourth surface performing total reflection of said bundle of second reflection state rays incident thereon after having propagated through said second prism piece;

a fifth surface being opposed to said variable mirror element and allowing said bundle of externally entered rays incident thereon after having propagated through said second prism piece, to pass therethrough and propagate toward said variable mirror element, and allowing both said bundle of first reflection state rays and said bundle of second reflection state rays incident thereon, each having been generated when said bundle of externally entered rays is irradiated to said variable mirror element, to pass therethrough and propagate through said second prism piece, said fifth surface being capable of reflecting at least said bundle of second reflection state rays incident thereon after having been totally reflected on said fourth surface and then propagated through said second prism piece; and a sixth surface allowing (i) transmission of both said bundle of first reflection state rays and said bundle of second reflection state rays incident thereon after having passed through said fifth surface and then propagated through said second prism piece without reaching said fourth surface, and (ii) transmission of said bundle of second reflection state rays incident thereon after having been reflected at least on said fifth surface and then propagated through said second prism piece, said sixth surface being capable of performing again total reflection of said bundle of second reflection state rays incident thereon after having been totally reflected on said fourth surface and then propagated through said second prism piece, and (c) said third prism piece comprising:

a seventh surface being opposed to said second and sixth surfaces, allowing transmission of said bundle of first reflection state rays incident thereon after having exited from said first prism piece, and allowing transmission of both said bundle of first reflection state rays and said bundle of second reflection state rays which are incident thereon after having exited from said second prism piece; and an eighth surface being opposed to said projection lens, and allowing said bundle of first reflection state rays incident thereon after having passed through said seventh surface and then propagated through said third prism piece, to pass therethrough and propagate toward said projection lens.

15. The projection optical system according to claim 14 further comprising a prism holding member that holds said prism by making contact with a portion of the outer shape of said prism except for portions of said prism through which said bundle of rays from said transfer optical system and said bundles of first reflection state rays pass.

16. The projection optical system according to claim 15 wherein said prism holding member comprises a portion for intercepting said bundles of second reflection state rays exiting from said prism.

17. The projection optical system according to claim 15 wherein said prism holding member comprises a surface opposed to said projection lens, said opposed surface of said prism holding member comprising a light exit opening sized to allow said bundles of first reflection state rays to pass therethrough.

18. A projection type display device comprising:

the projection optical system according to claim 14;

a signal generating part configured to generate electric signals for driving said variable mirror element to output said electric signals to said variable mirror element; and a screen configured to receive bundles of rays projected from said projection optical system.

19. A projection optical system comprising:

a light source;

a condensing optical system condensing rays from said light source;

a light intensity uniforming element comprising an entrance surface from which light condensed by said condensing optical system enters, and an exit surface from which a bundle of rays having a substantially uniform light intensity distribution exits;

a transfer optical system transferring said bundle of rays exiting from said exit surface of said light intensity uniforming element to a prism wherein said bundle of rays transferred by said transfer optical system enters said prism as a bundle of externally entered rays;

a variable mirror element; and a projection lens, wherein said prism is disposed between said variable mirror element and said projection lens having a projection optical axis parallel to a normal of said variable mirror element, said prism comprising:

a first inner surface comprising a first end spaced a first distance apart from said variable mirror element and a second end, said first inner surface being inclined from said first end to said second end in a direction away from said variable mirror element, said first inner surface being configured to totally reflect said bundle of externally entered rays and to propagate said bundle of externally entered rays thus reflected toward said variable mirror element; and a second inner surface comprising first and second ends spaced second and third distances apart from said variable mirror element, respectively, said second inner surface being configured (i) to transmit said bundle of externally entered rays totally reflected from said first inner surface to propagate said bundle of externally entered rays to said variable mirror element, (ii) to transmit a first bundle of rays in a first reflection state among bundles of rays reflected from said variable mirror element, and (iii) to totally reflect said first bundle of rays in a second reflection state among said bundles of rays reflected from said variable mirror element, said second reflection state being different from said first reflection state, said first distance being greater than said third distance, said third distance being greater than said second distance, and wherein, when said first bundle of rays in said first reflection state transmitted through said second inner surface enters said first inner surface, said first inner surface transmits said first bundle of rays in said first reflection state to propagate said first bundle of rays in said first reflection state toward said projection lens.

20. A projection type display device comprising:

the projection optical system according to claim 19;

a signal generating part configured to generate electric signals for driving said variable mirror element to output said electric signals to said variable mirror element; and a screen configured to receive bundles of rays projected from said projection optical system.

* * * * *